United States Patent
Schenk

(10) Patent No.: US 9,628,632 B2
(45) Date of Patent: Apr. 18, 2017

(54) METHOD OF TRANSMISSION POWER CONTROL AND COMMUNICATION DEVICE

(75) Inventor: Heinrich Schenk, Munich (DE)

(73) Assignee: Lantiq Beteiligungs-GmbH & Co. KG, Neubiberg (DE)

(*) Notice: Subject to any disclaimer, the term of this patent is extended or adjusted under 35 U.S.C. 154(b) by 917 days.

(21) Appl. No.: 13/098,227

(22) Filed: Apr. 29, 2011

(65) Prior Publication Data
US 2011/0206159 A1    Aug. 25, 2011

Related U.S. Application Data

(63) Continuation of application No. 11/950,283, filed on Dec. 4, 2007, now Pat. No. 8,009,749.

(51) Int. Cl.
H04L 27/00    (2006.01)
H04M 11/06    (2006.01)
H04L 27/26    (2006.01)

(52) U.S. Cl.
CPC ....... H04M 11/062 (2013.01); H04L 27/2614 (2013.01); H04L 27/2626 (2013.01)

(58) Field of Classification Search
USPC ........................................ 375/295
See application file for complete search history.

(56) References Cited

U.S. PATENT DOCUMENTS

| | | | |
|---|---|---|---|
| 5,479,447 A | 12/1995 | Chow et al. | |
| 6,081,505 A * | 6/2000 | Kilkki | 370/230 |
| 7,362,798 B1 | 4/2008 | Starnberger | |
| 2002/0044597 A1 | 4/2002 | Shively et al. | |
| 2004/0095921 A1 | 5/2004 | Kerpez | |
| 2005/0271127 A1 | 12/2005 | Cassiers et al. | |
| 2006/0093025 A1 * | 5/2006 | Suciu et al. | 375/222 |
| 2007/0274404 A1 | 11/2007 | Papandriopoulos et al. | |
| 2008/0112359 A1 * | 5/2008 | Cleveland et al. | 370/329 |

FOREIGN PATENT DOCUMENTS

| | | |
|---|---|---|
| DE | 100 38 375 A1 | 2/2002 |
| WO | WO 2007/066907 A1 | 6/2007 |

OTHER PUBLICATIONS

Yu, W., et al., "Distributed Mulituser Power Control for Digital Subscriber Lines," IEEE Jounal on Selected Areas in Communications, Jun. 2002, p. 1105-1115, vol. 20, No. 5.
"Transmission and Multiplexing™; Access transmission system on metallic access cables; Very high speed Digital Subscriber Line (VDSL); Part 1: Functional requirements," Technical Specification, Jun. 2005, 83 pages, ETSI TS 101 270-1, V1.4.1.
Cendrillon, R., et al., "Optimal Mulit-user Spectrum Balancing for Digital Subscriber Lines," IEEE Transactions on Communications, May 2006, p. 922-933, vol. 54, Issue: 5.

* cited by examiner

Primary Examiner — Tanmay Shah
(74) Attorney, Agent, or Firm — Eschweiler & Potashnik, LLC

(57) ABSTRACT

In a method of transmission power control, transmission powers of transmission channels and/or transmission power spectral densities are adjusted so as to improve the transmission characteristics.

28 Claims, 19 Drawing Sheets

METHOD OF TRANSMISSION POWER CONTROL AND COMMUNICATION DEVICE

This is a continuation application of U.S. application Ser. No. 11/950,283, entitled "Method of Transmission Power Control and Communication Device," which was filed on Dec. 4, 2007, now U.S. Pat. No. 8,009,749 and is hereby incorporated herein by reference in its entirety.

BACKGROUND

Embodiments of the present invention relate to a method of transmission power control and to a corresponding communication device.

In communication systems, such as in digital communication systems of the DSL type (DSL: digital subscriber line), it is known to use a broad frequency band for transmitting digital signals. A plurality of frequency subchannels are provided in the frequency band. The frequency subchannels may also be referred to as signal tones. When transmitting digital data using the DSL technique, the transmission range, i.e., the maximum distance over which reliable data transmission is possible, decreases with increasing bit rate due to the attenuation characteristics of the transmission line. Further, with increasing frequency also disturbances due to crosstalk increase. For example, problems due to crosstalk may arise in a system in which a plurality of transmission lines are included in a single cable. In particular, excessive transmission power on one of the transmission lines may cause disturbances on the other transmission lines. Crosstalk may also be a problem in other types of communication systems.

SUMMARY OF THE INVENTION

According to one embodiment of the invention, a method of transmission power control comprises applying an optimization algorithm to adjust a transmission power spectral density of each of a plurality of transmission channels, each of the transmission channels comprising a plurality of frequency subchannels, determining a transmission channel in which, after adjusting the transmission power spectral density, a portion of the frequency subchannels is unused, and determining a group of the remaining transmission channels, and applying the optimization algorithm to adjust the transmission power spectral density of each of the remaining transmission channels with respect to the unused portion of the frequency subchannels.

According to a further embodiment of the invention, a method of transmission power control comprises assigning a relative bit rate to each of a plurality of transmission channels, the relative bit rate defining a nominal bit rate distribution, and adjusting a transmission power of each transmission channel in such a way that an effective bit rate distribution conforms to the nominal bit rate distribution.

According to a still further embodiment of the invention, a method of transmission power control comprises applying an optimization algorithm to adjust a transmission power spectral density of at least one transmission channel comprising a plurality of frequency subchannels, the optimization algorithm maximizing a total bit rate function of the transmission channel given by, $$B = f_T \cdot \sum_j \log_2\left(\frac{p_j \cdot |H_j|^2}{\Gamma \cdot \sigma_j^2}\right),$$

wherein:

$p_j$ is the transmission power of the j-th frequency subchannel, $|H_j|^2$ is the power transmission function of the j-th frequency subchannel, $\sigma_j^2$ is an interfering power of the j-th frequency subchannel at the receiver, $\Gamma$ is a signal-to-noise ratio gap parameter with $\Gamma \geq 1$, and $f_T$ is the symbol frequency.

DETAILED DESCRIPTION OF ILLUSTRATIVE EMBODIMENTS

In the following, the present invention will be explained in more detail by referring to exemplary embodiments thereof. The description is not to be taken in a limiting sense, but is made only for the purpose of illustrating the general principles of the invention, and the scope of the invention is only defined by the claims and is not intended to be limited by the exemplary embodiments described hereinafter.

It is to be understood that in the following detailed description of exemplary embodiments any shown or described direct connection or coupling between two functional blocks, devices, components, or other physical or functional units could also be implemented by indirect connection or coupling. Further, it is to be understood that the processes described hereinafter could be implemented by hardware, by software, or by a combination thereof.

In the following, exemplary embodiments of the invention are described, which relate to a DSL communication system and to methods of transmission power control in the DSL communication system. However, in other embodiments, the methods may also be applied to other types of communication systems, e.g., other types of wired communication systems or wireless communication systems. Further, the communication system may correspond to different types of DSL communication systems, e.g., an ADSL communication system, an SDSL communication system, or a VDSL communication system. The transmission power control processes may be implemented in central office equipment, e.g., in a transmission power control system of a digital subscriber line access multiplexer (DSLAM). In other embodiments, the power control processes may be implemented in other types of communication devices. As used herein, the term "transmission channel" is intended to encompass a transmission line and other types of physical transmission paths, e.g., a wireless transmission path. A transmission channel may comprise a plurality of frequency subchannels or set of frequency subchannels. The frequency subchannels may also be referred to as signal tones.

Figure 1:
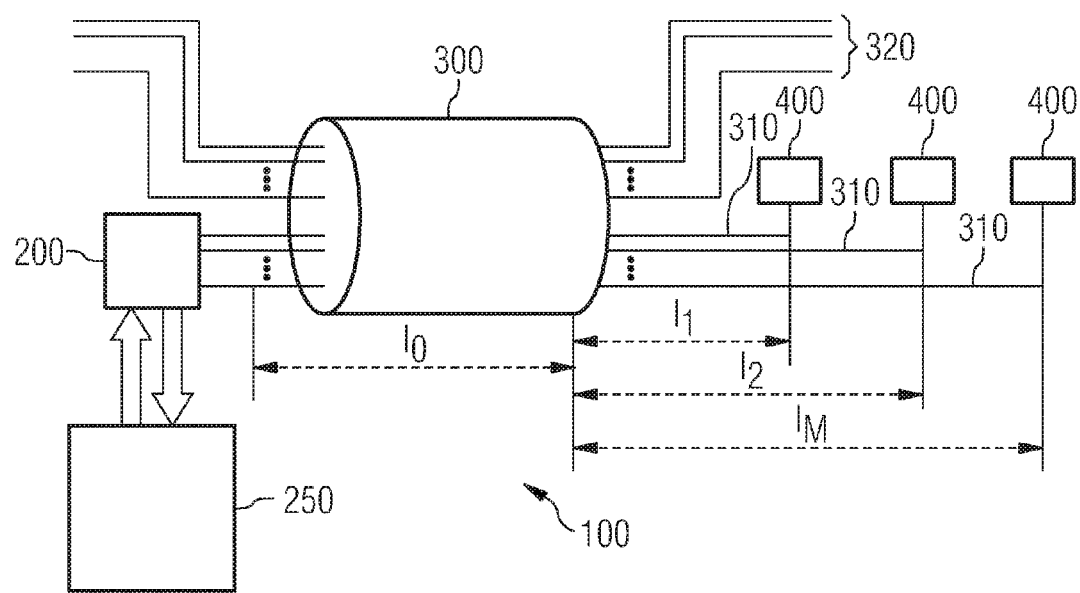
FIG. 1 schematically represents a communication system according to an embodiment of the invention.

FIG. 1 schematically illustrates a communication system 100 according to an embodiment of the invention. The communication system 100 may correspond to a DSL communication system, for example, a VDSL communication system. In other embodiments, other types of communication system may be provided.

The communication system 100 comprises a plurality of subscribers 400. Each of the subscribers 400 is coupled to central office equipment via a respective transmission channel in the form of a transmission line 310. In other types of communication systems, other types of transmission channels may be used, e.g., wireless transmission channels. The central office equipment comprises a DSLAM 200, which is coupled to a power control system 250. The power control system 250 may also be referred to as a controller. The DSLAM 200 comprises a plurality of transmission ports, each coupled to a respective transmission line 310. In other embodiments, the power control system 250 may be integrated within the DSLAM 200. Further, the power control system 250 could also be coupled to other types of communication devices, e.g., to a DSL modem or to a wireless base station.

The transmission lines 310 are bundled in a single cable 300. As illustrated, the cable 300 may also comprise other transmission lines 320, which are not used by the DSL communication system 100, e.g., analog telephone lines.

According to an embodiment of the invention, the power control system 250 controls the transmission powers of DSL communication signals transmitted via the transmission lines 310. As further illustrated, the transmission lines 310 may have different lengths, which is typical for a situation in which the individual subscribers 400 are located at different positions. A total length of a transmission line 310 is given by $l_0+l_i$, i=1, . . . , M denoting an index of the transmission line. Due to the different lengths, the transmission lines 310 may have different signal transmission characteristics, e.g., different signal attenuations. The purpose of the power control system 250 is to take into account the different signal transmission characteristics of the transmission lines 310 and to adjust the individual transmission powers and/or the transmission power spectral densities of the transmission lines 310 accordingly. The transmission powers may be controlled both for a downstream direction, i.e., from the DSLAM 200 to the subscribers 400, and in an upstream direction, i.e., from the subscribers 400 to the DSLAM 200. However, in the following only the case of controlling the transmission powers and the transmission power spectral densities in the upstream direction will be discussed. Controlling the transmission power in the upstream direction in a communication system as illustrated in FIG. 1 may be provided with respect to reducing the effects of far-end crosstalk, such as far-end crosstalk between transmission lines having different lengths. In the following, methods and principles of controlling the transmission powers and the transmission powers spectral densities will be explained in more detail.

Figure 2:
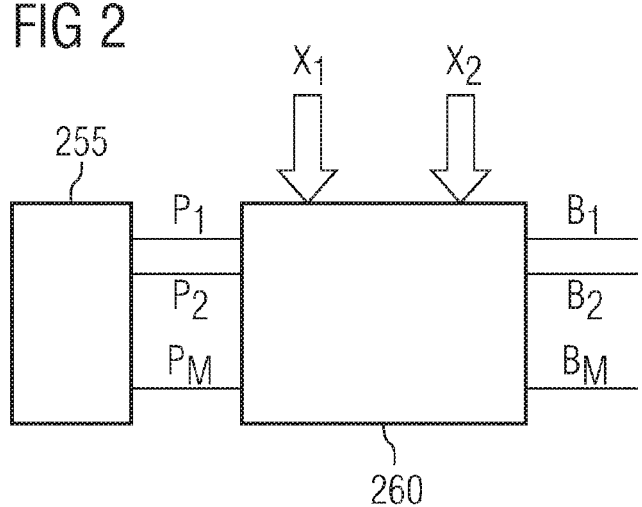
FIG. 2 schematically represents a transmission power control system according to an embodiment of the invention.

FIG. 2 schematically illustrates a power control system according to an embodiment of the invention. The power control system comprises a power adjustment block 255 and a power spectral density adjustment block 260. The power adjustment block adjusts a transmission power of each of the transmission lines. The adjusted transmission power values are supplied to the power spectral density adjustment block 260. Further input parameters of the power spectral density adjustment block 260 comprise transmission line characteristics $X_1$, such as attenuation and far-end crosstalk characteristics, and other interfering powers, e.g., due to external disturbers. The power spectral density adjustment block 260 outputs a maximum achievable bit rate for each of the transmission lines.

In general, the maximum bit rates are a function of the transmission powers of the individual transmission lines, i.e., $$B = f(P), \quad (1)$$

wherein $$B = \begin{pmatrix} B_1 \\ \vdots \\ B_M \end{pmatrix} \quad (2)$$

is a bit rate vector, $$P = \begin{pmatrix} P_1 \\ \vdots \\ P_M \end{pmatrix} \quad (3)$$

is a transmission power vector and M denotes the number of transmission lines. Each component of the bit rate vector corresponds to the maximum bit rate of an individual transmission line, and each component of the transmission power vector corresponds to the transmission power of an individual transmission line.

According to an embodiment of the invention, a method of transmission power control starts with a weight vector:

$$G = \begin{pmatrix} G_1 \\ \vdots \\ G_M \end{pmatrix} \quad (4)$$

which defines a nominal relative bit rate distribution. For example, if similar bit rates are desired for all transmission lines, all components of the weight vector are set to one. If, for example, it is desired to have a bit rate of a short transmission line twice as high as a bit rate of a long transmission line, the corresponding components of the weight vector are about 1 and about 0.5. The components of the weight vector may also be referred to as weight factors.

According to the embodiment, the transmission powers of the individual transmission lines are then iteratively calculated in such a way that the actual or effective relative bit rate distribution conforms to the nominal relative bit rate distribution.

In the following, $$P_k = \begin{pmatrix} P_{1,k} \\ \vdots \\ P_{M,k} \end{pmatrix} \quad (5)$$

denotes the transmission power vector in the k-th iteration step.

From the components of the transmission power vector in the k-th iteration step, the transmission power vector in the (k+1)-th iteration step is calculated according to:

$$P_{k+1} = \begin{pmatrix} P_{1,k} \cdot K_{1,k} \\ \vdots \\ P_{M,k} \cdot K_{M,k} \end{pmatrix}, \quad (6)$$

wherein $$K_k = \begin{pmatrix} K_{1,k} \\ \vdots \\ K_{M,k} \end{pmatrix} = \begin{pmatrix} s^{-\Delta B_{1,k} \cdot \alpha(k)} \\ \vdots \\ s^{-\Delta B_{M,k} \cdot \alpha(k)} \end{pmatrix} \quad (7)$$

is a scaling vector calculated on the basis of the bit rate vector $$B_k = \begin{pmatrix} B_{1,k} \\ \vdots \\ B_{M,k} \end{pmatrix} \quad (8)$$

in the k-th iteration step.

From the bit rate vector and the weight vector, a weighted bit rate vector:

$$Bg_k = \begin{pmatrix} Bg_{1,k} \\ \vdots \\ Bg_{M,k} \end{pmatrix} = \begin{pmatrix} B_{1,k}/G_1 \\ \vdots \\ B_{M,k}/G_M \end{pmatrix} \quad (9)$$

is calculated. From the weighted bit rate vector, a difference vector is calculated according to:

$$\Delta B_k = \begin{pmatrix} \Delta B_{1,k} \\ \vdots \\ \Delta B_{M,k} \end{pmatrix} = \begin{pmatrix} Bg_{1,k} - \min\{Bg_{1,k}, \ldots, Bg_{M,k}\} \\ \vdots \\ Bg_{M,k} - \min\{Bg_{1,k}, \ldots, Bg_{M,k}\} \end{pmatrix}. \quad (10)$$

The components of the difference vector are used in Equation (7) for calculating the scaling vector. In Equation (7) s and $\alpha(k)$ are selected to be larger than one.

According to an embodiment, s=10. Further, $\alpha(k)$ may be varied depending on the iteration step, i.e., as a function of k. By this means, convergence speed and precision of the iteration process can be adjusted. In other embodiments, other values of s may be selected, and $\alpha(k)$ may have the same value irrespective of the iteration step, e.g., $\alpha(k)=1$.

Summarizing the above Equations (6)-(10), the components of the transmission power vector in the (k+1)-th iteration step may thus be calculated according to:

$$P_{i,k+1} = P_{i,k} \cdot s^{-(Bg_{i,k} - \min\{Bg_{1,k}, \ldots, Bg_{M,k}\}) \cdot \alpha(k)}. \quad (11)$$

Next, the calculated transmission power vector is subjected to a scaling operation according to:

$$P_k := P_k \cdot \frac{P_{max}}{\max\{P_1, \ldots, P_{M,k}\}}. \quad (12)$$

In other words, the components of the scaled transmission power vector may be calculated according to:

$$P_{i,k} := P_{i,k} \cdot \frac{P_{max}}{\max\{P_{0,k}, \ldots, P_{M,k}\}}. \tag{13}$$

That is to say, the components of the transmission power vector in the k-th iteration step are scaled in such a way that the largest component of the transmission power vector corresponds to a maximum admissible transmission power $P_{max}$ of a transmission line.

On the basis of the scaled transmission power vector, the transmission power control system calculates transmission power spectral densities of the individual transmission lines and the corresponding maximum achievable bit rate, i.e., the bit rate vector of the next iteration step. For this purpose, an optimization algorithm, such as the waterfilling algorithm, may be applied. The waterfilling algorithm and other types of suitable optimization algorithms will be explained below. This process may be iteratively repeated until the deviation of the resulting relative bit rate distribution from the nominal relative bit rate distribution, i.e., from the weight vector, is below a predefined threshold or a maximum number of iteration steps is reached.

Figure 3:
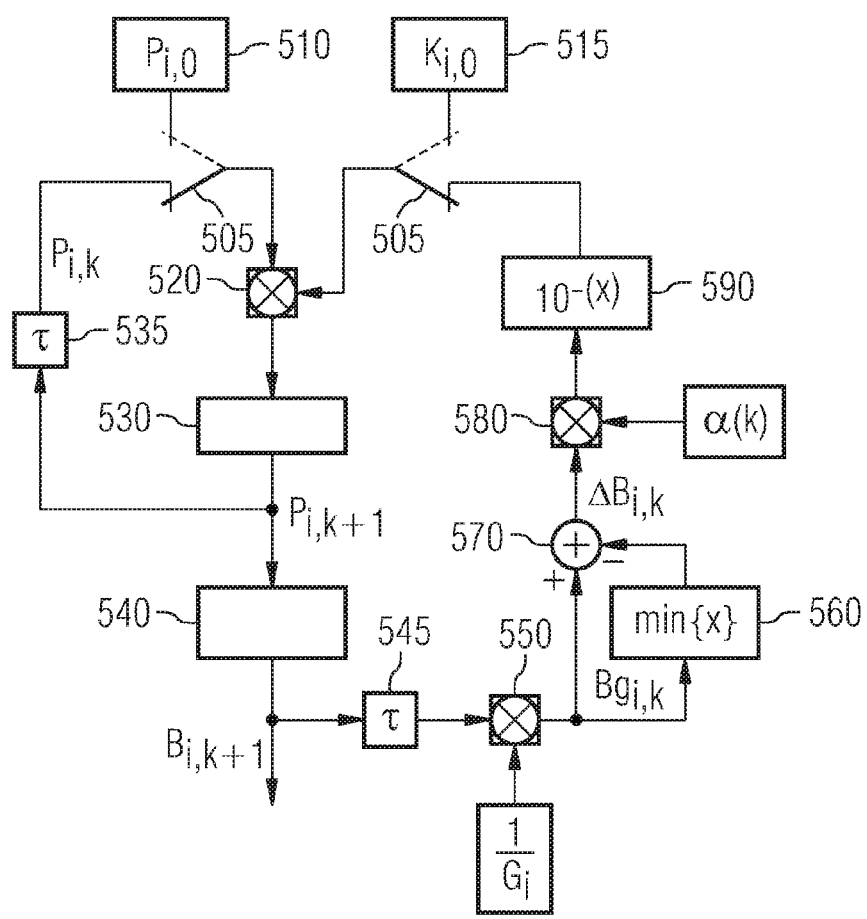
FIG. 3 shows a block diagram for illustrating a method of transmission power control according to an embodiment of the invention.

FIG. 3 shows a block diagram which schematically illustrates the above-mentioned method of transmission power control.

The process starts with initial values of the components of the transmission power vector $P_{i,0}$ and initial values of the components of the scaling vector $K_{i,0}$. The initial values of the components of the scaling vector $K_{i,0}$ may be one for each of the transmission lines. These initial values are provided at blocks 510, 515 and then supplied to the iteration process as schematically illustrated by switches 505. After the iteration process is started, the switches 505 are changed from the position illustrated by the dotted line to the position illustrated by the solid line.

At block 520, the components of the transmission power vector are multiplied with the respective components of the scaling vector according to Equation (6).

In block 530, scaling of the calculated transmission power vector according to Equation (12) is accomplished. The scaled transmission power vector is stored at block 535 to be used in the next iteration step.

In block 540, transmission power spectral densities of the individual transmission lines and the corresponding maximum achievable bit rates are calculated. The maximum achievable bit rates, i.e., the obtained bit rate vector, are stored at block 545 to be used in the next iteration step.

At block 550, the components of the bit rate vector are divided by the components of the weight vector to obtain the weighted bit rate vector according to Equation (9).

The weighted bit rate vector is supplied to block 560 so as to determine the minimum component of the bit rate vector. The result of this operation and the weighted bit rate vector are then supplied to block 570.

In block 570, the difference vector is calculated according to Equation (10). The difference vector is supplied to block 580.

In block 580, the difference vector is multiplied with the parameter $\alpha(k)$. The result of this operation is supplied to block 590, where the calculation of the new scaling vector is finalized by exponentiating as explained in connection with Equation (7).

The process may then be iteratively repeated with the newly calculated scaling vector and the transmission power vector as stored in block 535.

In the following, specific examples of the above method of adjusting the transmission power will be described with reference to simulation results on the upstream transmission channels of a VDSL-2 communication system. In the simulations, a cable having ten transmission lines i=1 to i=10, each configured as a twisted line pair, was considered. The length of the transmission lines was assumed to be equally distributed at intervals of about 25 m in a range from about 275 m to about 500 m. The wires of the transmission line were assumed to have a diameter of about 0.4 mm, and typical attenuation and crosstalk characteristics were assumed. Further, an interfering signal in the form of white noise with a spectral power density of about −130 dBm/Hz was assumed. The utilized frequency bands are illustrated in FIG. 4 and correspond to the standard ETSI TS101 270-1 V13.1.

Figure 4:
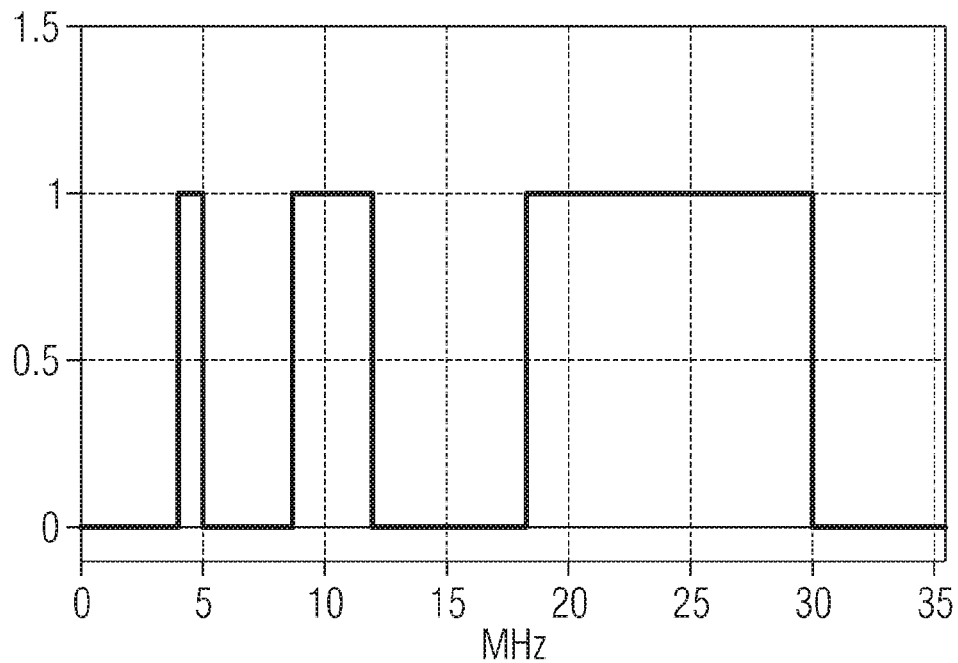
FIG. 4 illustrates an example of utilized frequency bands in a communication system according to an embodiment of the invention.
Figure 5:
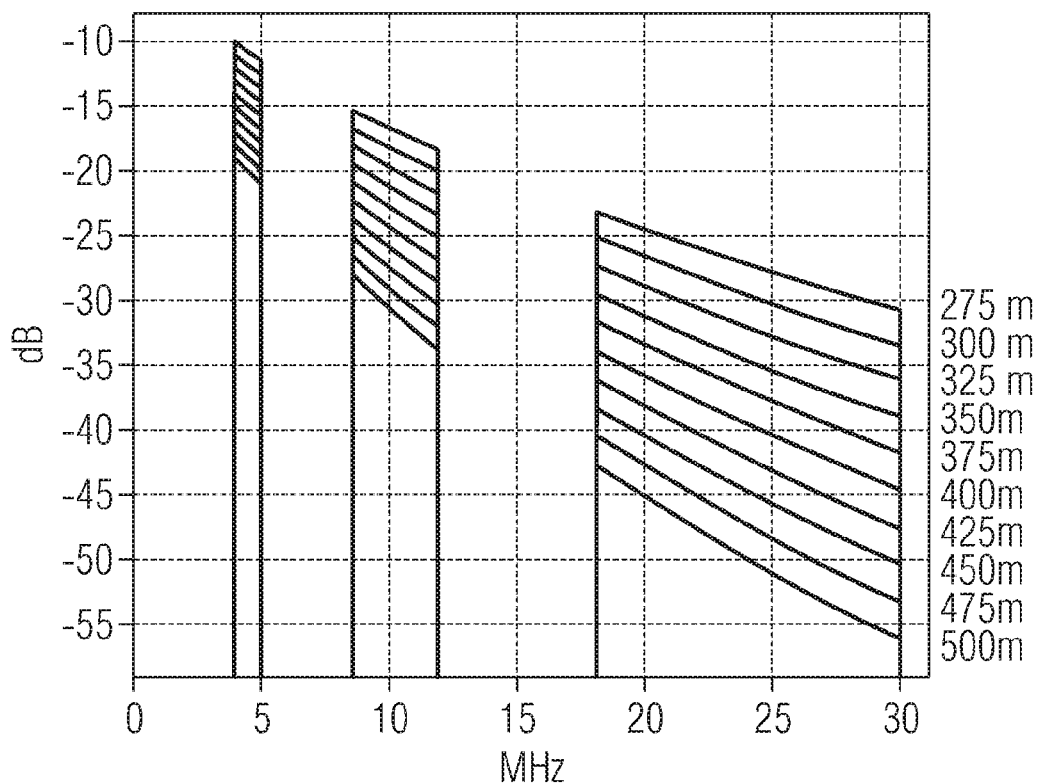
FIG. 5 illustrates an example of transmission line attenuations in a communication system according to an embodiment of the invention.

As illustrated in FIG. 4, an upper frequency limit is at about 30 MHz. The distance of the frequency subchannels or signal tones used by the communication system is about 8.625 kHz. The signal attenuations of the transmission lines in the utilized frequency bands are illustrated in FIG. 5.

For adjusting the transmission power spectral densities, i.e., the distribution of transmission power among the frequency subchannels, the waterfilling algorithm was used. A signal-to-noise-ratio gap parameter of about 11 dB was selected. The maximum admissible transmission power was assumed to be about 13.5 dBm.

In a first example, equal bit rates were assigned to all subscribers. Accordingly, the components of the weight vector were all set to one:

$$G = \begin{pmatrix} 1 \\ \vdots \\ 1 \end{pmatrix} \tag{14}$$

Figure 6:
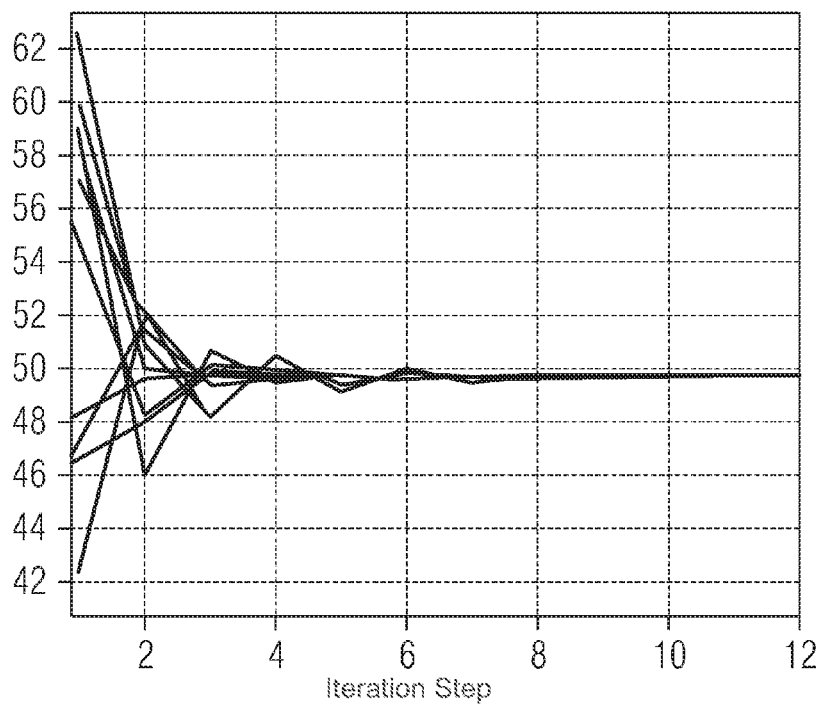
FIG. 6 illustrates an exemplary course of bit rates during adjustment of transmission powers according to the method of FIG. 3.
Figure 7:
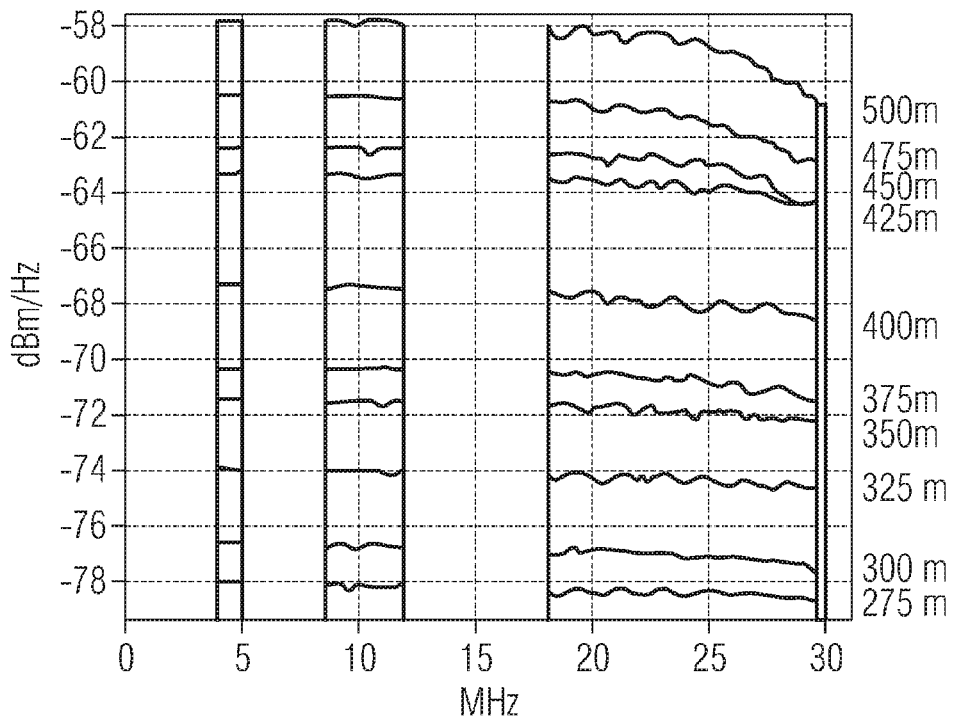
FIG. 7 illustrates exemplary power spectral densities after adjustment of transmission powers according to the method of FIG. 3.

In FIG. 6, the resulting course of the bit rates during the iterative adjustment process of the transmission powers is illustrated. As can be seen, the bit rates each approach a bit rate of approximately 50 MBit/s. The corresponding transmission power spectral densities of the individual transmission lines after the adjustment of the transmission powers is shown in FIG. 7. As can be seen, the resulting power spectral densities increase with increasing length of the transmission line.

Figure 8:
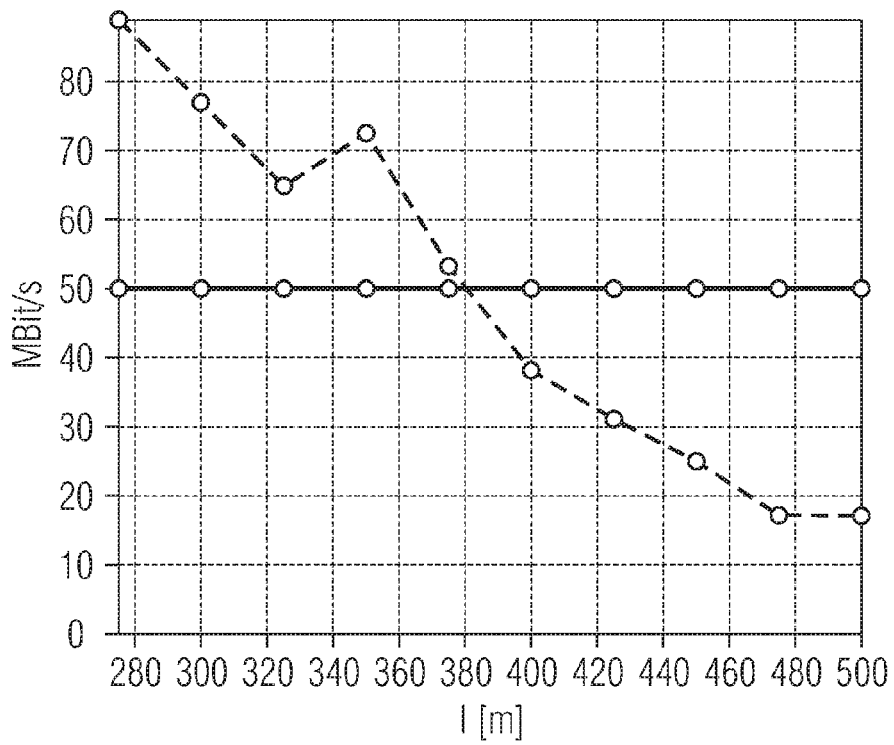
FIG. 8 compares exemplary bit rates with and without adjustment of transmission powers according to the method of FIG. 3.

In FIG. 8, the bit rates of the individual transmission lines after adjustment of the transmission powers according to the method of FIG. 3 are illustrated by a solid line. For comparison, the resulting bit rates without adjustment of the transmission powers and transmission power spectral densities are illustrated as a dashed line. As can be seen, by means of adjusting the transmission powers according to the method of FIG. 3, the bit rates of the longer transmission lines can be significantly increased. On the other hand, the bit rates of the shorter transmission lines decrease.

Figure 9:
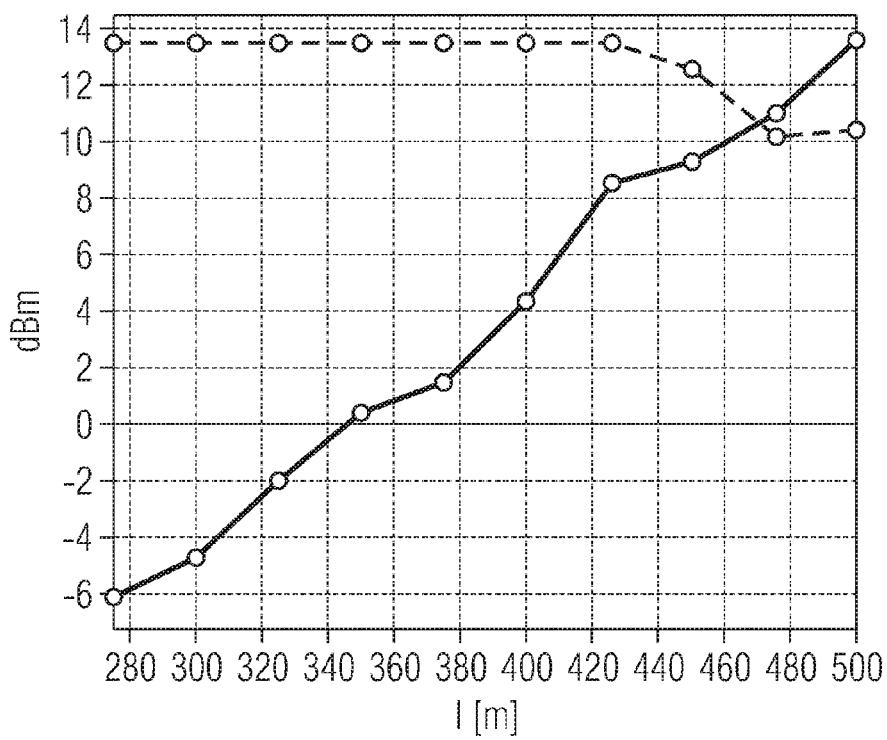
FIG. 9 compares exemplary transmission powers with and without adjustment of transmission powers according to the method of FIG. 3.

FIG. 9, the transmission powers after adjustment of the transmission powers according to the method of FIG. 3 are illustrated as a solid line. For comparison, the transmission powers without adjustment of the transmission powers and of the transmission power spectral densities are illustrated as a dashed line. In the latter case, the transmission power is equally distributed over the utilized frequency bands and the transmission power is equal for most of the transmission lines. However, for the longer transmission lines, the transmission power is reduced as it is not possible to use the full frequency range up to the upper frequency limit due to the attenuation characteristics of the transmission line.

In a further example, the same communication system as in the previous example was considered. However, a different nominal relative bit rate distribution was defined. In particular, the full bit rate was assigned to the transmission lines i=1 to i=3 and to the transmission lines i=8 to i=10, whereas to the transmission lines i=4 to i=7 only half of the bit rate was assigned. Accordingly, the weight vector was defined as follows:

$$G = \begin{pmatrix} 1 \\ 1 \\ 1 \\ 1 \\ 0.5 \\ 0.5 \\ 0.5 \\ 0.5 \\ 1 \\ 1 \\ 1 \end{pmatrix}. \quad (15)$$

Figure 10:
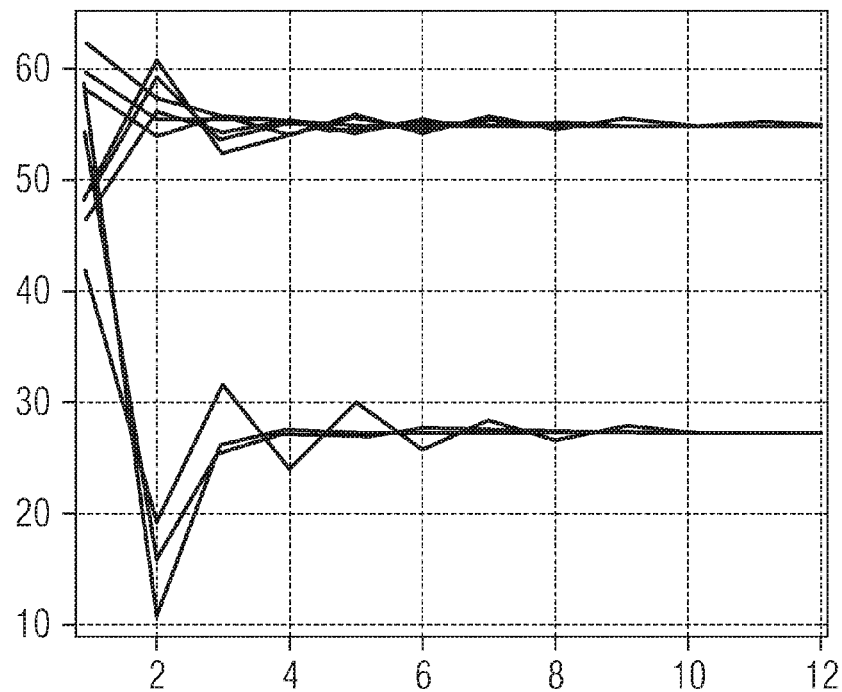
FIG. 10 illustrates a further exemplary course of bit rates during adjustment of the transmission powers according to the method of FIG. 3.

FIG. 10 illustrates the course of the resulting bit rates during the iterative adjustment process of the transmission powers according to the method of FIG. 3. As can be seen, the approached bit rates of the transmission lines i=1 to i=3 and i=8 to i=10 is twice the approached bit rate of the transmission lines i=4 to i=7. The resulting bit rates and the resulting transmission powers after adjustment of the transmission powers are illustrated by a solid line in FIGS. 11 and 12, respectively. For comparison, also the bit rates and the transmission powers without adjustment of the transmission powers and of the transmission power spectral densities are illustrated as dashed lines.

Figure 11:
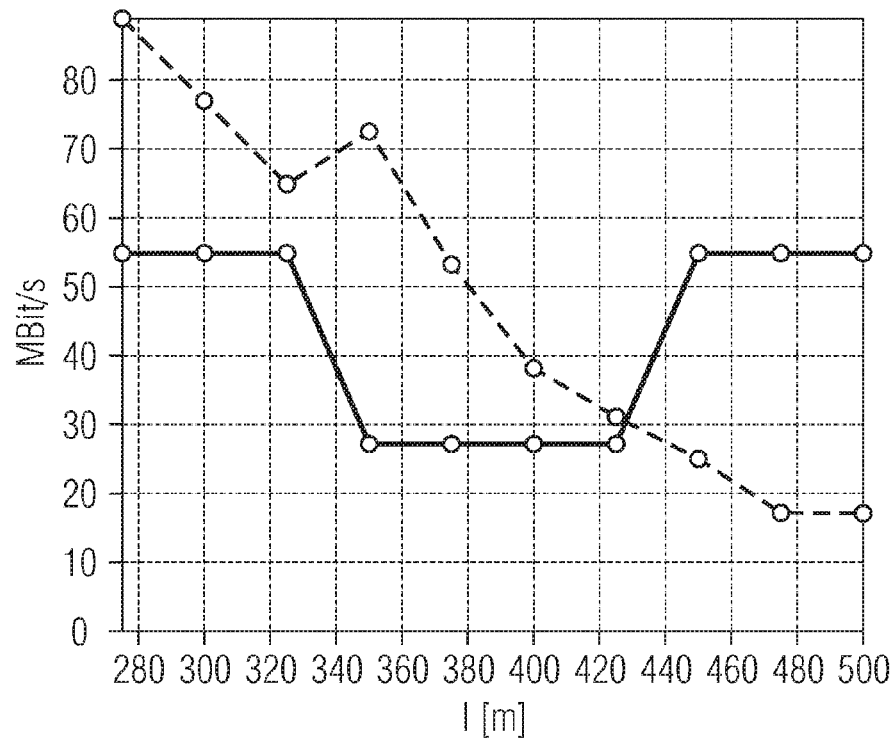
FIG. 11 compares exemplary bit rates with and without adjustment of the transmission powers according to the method of FIG. 3.
Figure 12:
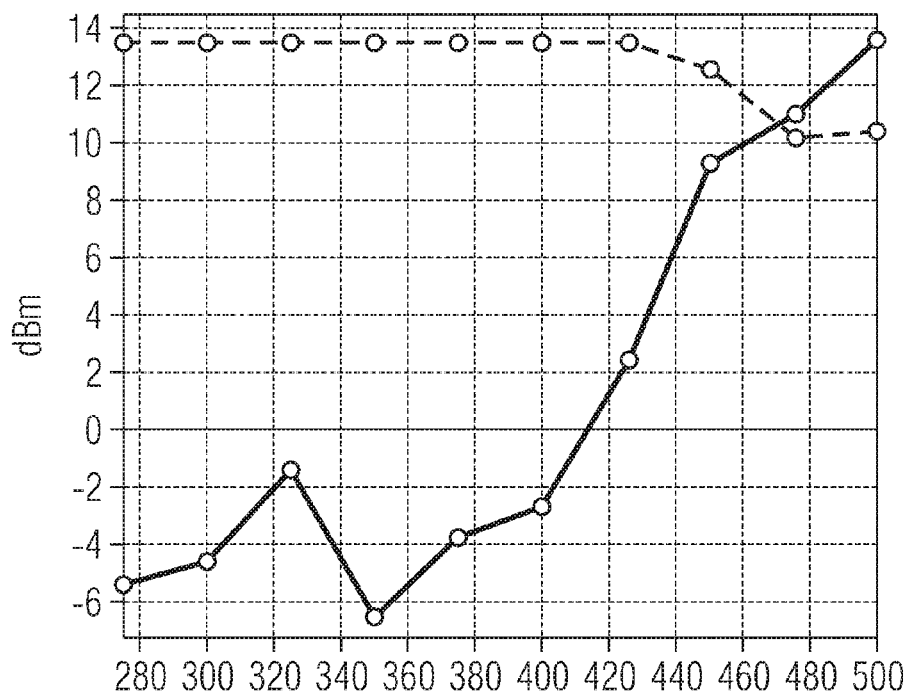
FIG. 12 compares exemplary transmission powers with and without adjustment of the transmission powers according to the method of FIG. 3.

As can be seen from FIGS. 10-12, for the transmission lines i=1 to i=3 and i=8 to i=10, bit rates of about 55 Mbit/s are obtained. For the transmission lines i=4 to i=7, bit rates of about 27.5 Mbit/s are obtained. Accordingly, as compared to the previous example, the bit rate of the longest transmission line can be increased from about 50 Mbit/s to about 55 Mbit/s. This is made possible because relatively lower bit rates have been assigned to the transmission lines in the medium length range, thereby reducing the negative effects of crosstalk on the maximum achievable bit rates of the other transmission lines.

Accordingly, assigning relative bit rates to the transmission lines allows for an improved usage of the capacities of a transmission channel. As compared to that, assigning absolute values of the bit rates to the transmission lines is more complicated and requires knowledge of at least a rate region which is feasible for the transmission lines of the particular communication system.

Figure 13:
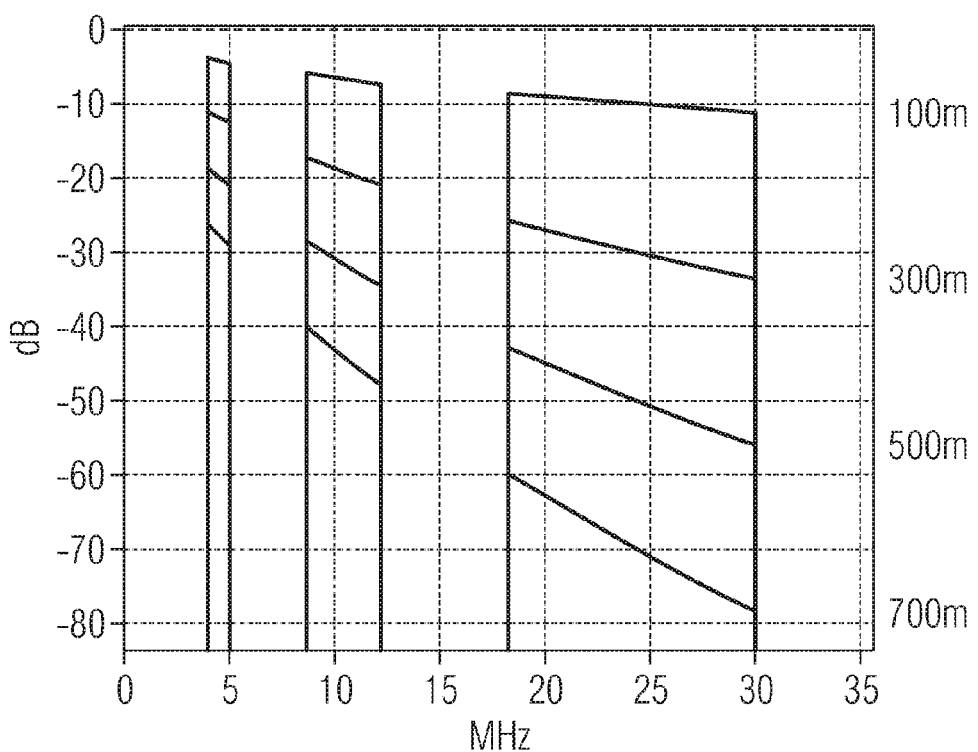
FIG. 13 illustrates a further example of transmission line attenuations in a communication system according to an embodiment of the invention.

In the following, a further example will be discussed, in which the differences in length between the individual transmission lines is larger as compared to the previously described examples. In particular, a communication system having four transmission lines i=1 to i=4 in a single cable was considered. Otherwise, the parameters of the communication system correspond to those of the previous examples. The length of the individual transmission lines was assumed to be 100 m, 300 m, 500 m, and 700 m for the transmission lines i=1, i=2, i=3, and i=4, respectively. The corresponding signal attenuations are illustrated in FIG. 13. Due to the increased attenuation of the longest transmission line, only half of the bit rate was assigned to this transmission line, i.e., the weight vector was selected according to:

$$G = \begin{pmatrix} 1 \\ 1 \\ 1 \\ 0.5 \end{pmatrix} \quad (16)$$

Figure 14A:
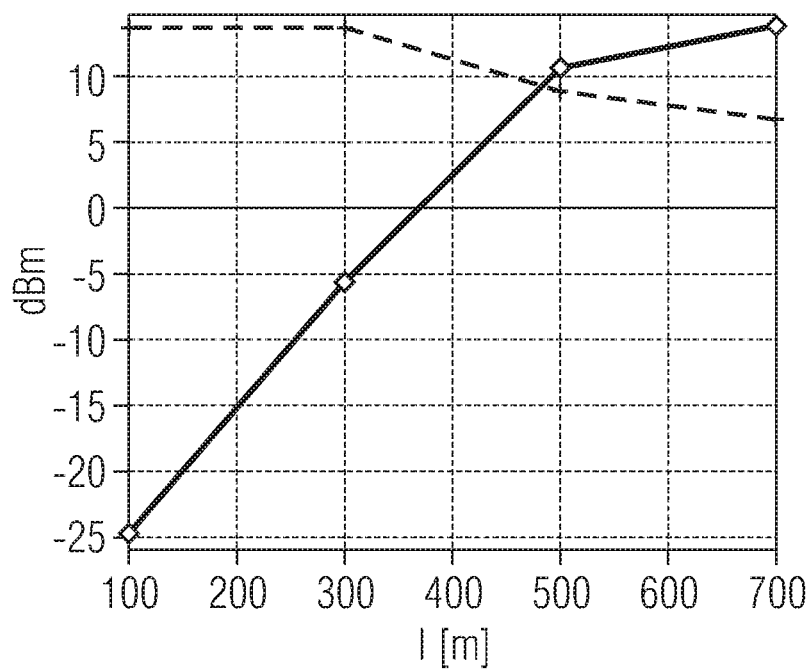
FIG. 14(A) compares transmission powers with and without adjustment of transmission powers according to the method of FIG. 3, and FIG. 14(B) compares maximum bit rates with and without adjustment of the transmission powers according to the method of FIG. 3.
Figure 14B:
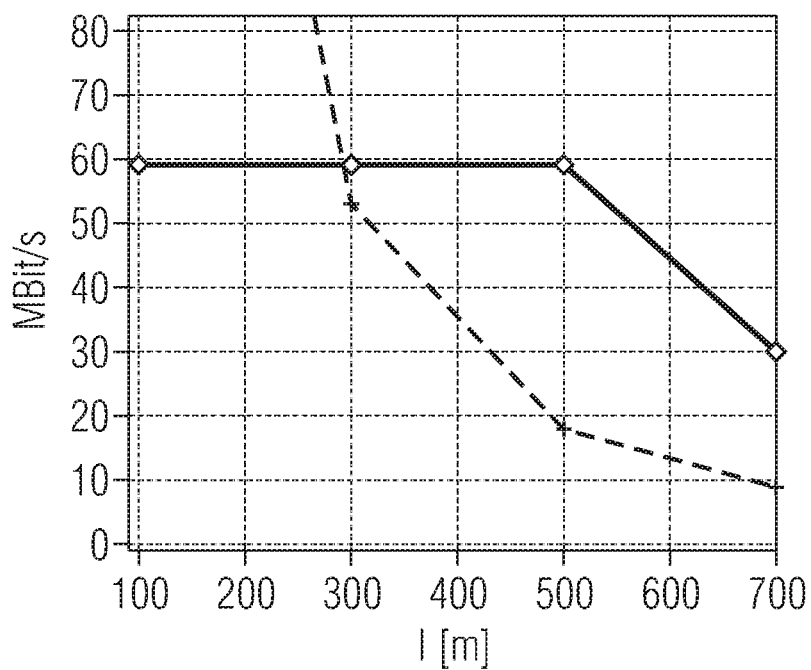

In FIG. 14(A), the resulting transmission powers of the individual transmission lines after adjusting the transmission powers according to the method of FIG. 3 are illustrated by a solid line. For comparison, the transmission powers of the individual transmission lines without adjustment of the transmission powers and of the transmission power spectral densities are illustrated by a dashed line. In FIG. 14(B), the resulting bit rates after adjustment of the transmission powers according to the method of FIG. 3 are illustrated by a solid line. For comparison, the resulting bit rates without adjustment of the transmission powers and of the power spectral densities are illustrated by a dashed line. The resulting transmission power spectral densities of the individual transmission lines after adjustment of the transmission powers according to the method of FIG. 3 are illustrated in FIG. 15.

Figure 15:
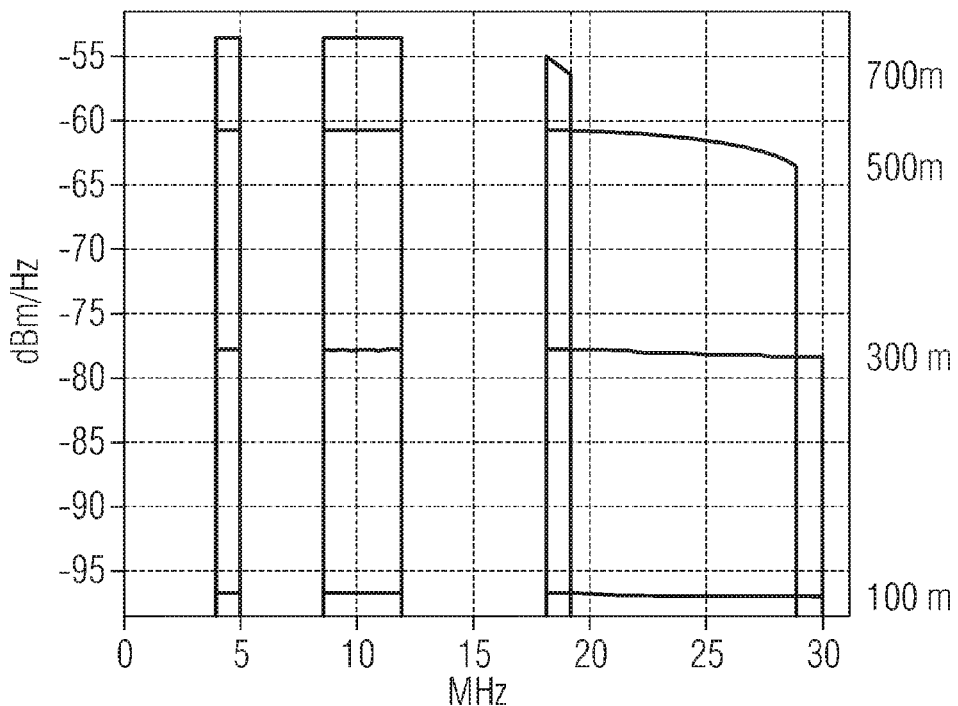
FIG. 15 illustrates exemplary transmission power spectral densities after adjustment of the transmission powers according to the method of FIG. 3.

As can be seen from FIG. 15, the longer transmission lines having lengths of about 500 m and about 700 m are not using the entire possible frequency range up to the upper frequency limit.

In view of the situation as described in the example of FIG. 13-15, a method of transmission power control according to a further embodiment of the invention includes determining a transmission channel in which, after adjusting the transmission power spectral density, a portion of the frequency subchannels is unused, determining a group of the remaining transmission channels, and adjusting the transmission power spectral densities of the remaining transmission channels with respect to the unused portion of the frequency subchannels. Again, for adjusting the transmission power spectral densities, the waterfilling algorithm may be used. In other embodiments, other types of optimization algorithms may be used.

The above steps of determining a transmission channel with an unused portion of the frequency subchannels and adjusting the transmission power spectral densities of the remaining transmission channels may be repeated until in the remaining transmission channels all frequency subchannels are used. A corresponding method of transmission power control is illustrated by the flow chart of FIG. 16.

The method starts at step 610, in which a useable frequency range and a maximum admissible transmission power are defined. Further, in step 615, a weight vector is defined, as described in connection with the method of FIG. 3.

In step 620, the transmission power spectral densities of the individual transmission lines are adjusted on the basis of an optimization algorithm. Further, the transmission powers of the individual transmission lines may be adjusted. This process may substantially correspond to the method as described in connection with FIG. 3.

In step 630, a transmission line is determined in which not the entire usable frequency range is utilized. In other words, a transmission channel is determined which has unused frequency subchannels. If there are multiple transmission channels with unused frequency subchannels, the selection may be further based on the adjusted transmission powers of the transmission channels. In this case, the transmission channel having the largest transmission power is selected among the transmission channels having unused frequency subchannels. In general, this transmission channel may be considered to have the worst transmission characteristics.

In step 640, a group of the remaining transmission channels is determined, and in step 650, a new usable frequency range is determined, which excludes the unused frequency range of the worst transmission channel.

Then, in step 660, a new maximum admissible transmission power is determined. In particular, the new maximum transmission power is selected to correspond to the maximum value of the adjusted transmission powers of the remaining transmission channels.

Then the sequence of steps 620 to step 660 may be repeated until in step 630 no further transmission channels having unused frequency subchannels can be determined. In the latter case, the method ends at step 690.

Figure 16:
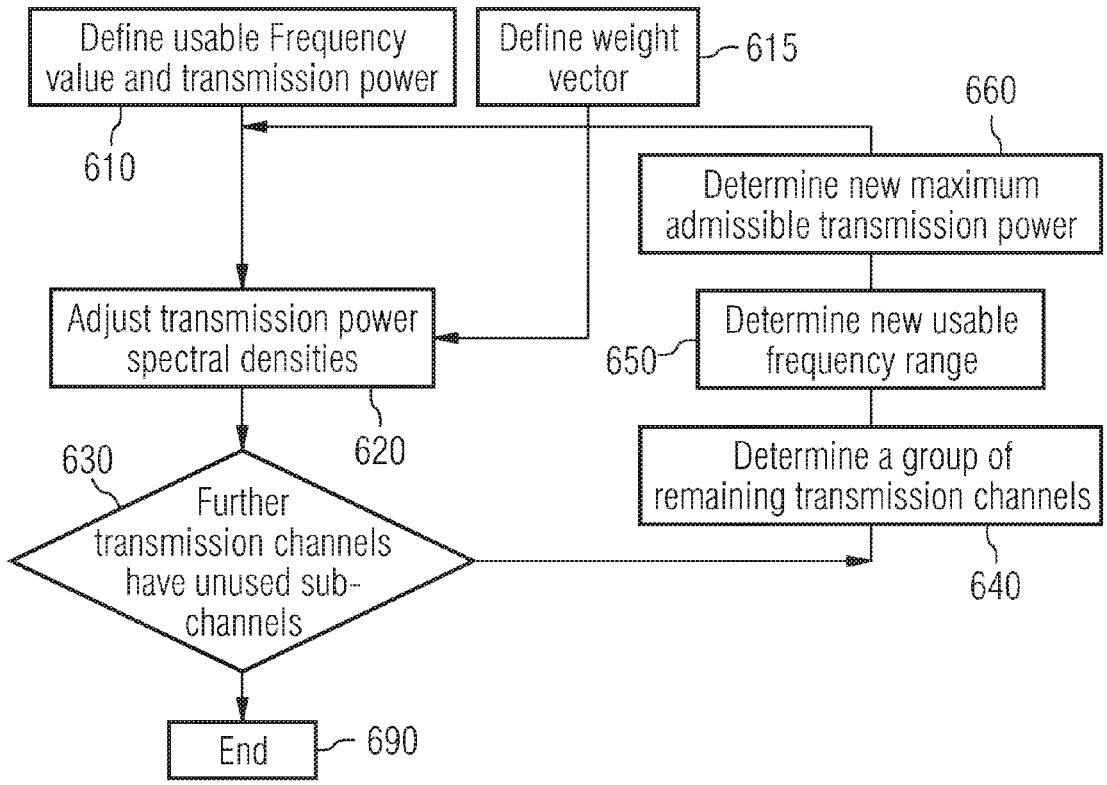
FIG. 16 shows a flow chart illustrating a method of transmission power control according to a further embodiment of the invention.

In the following, an example will be discussed, in which the method of FIG. 16 is applied to a communication system corresponding to the example of FIGS. 13-15.

As above, after the first adjustment of the transmission powers and of the transmission power spectral densities of the individual transmission lines according to the method of FIG. 3, the longest transmission line having a length of about 700 m does not use all available frequency subchannels. Also the transmission line having the length of about 500 m does not use all available frequency subchannels. This can be seen in FIG. 15. Further, as can be seen in FIG. 14, the adjusted transmission power of the transmission line having the length of about 700 m is larger than the adjusted transmission power of the transmission line having the length of 500 m. Accordingly, the transmission line having the length of about 700 m can be assumed to have the worst transmission characteristics. Further, as can be seen from FIG. 15, the transmission line having the length of about 700 m also has the largest unused portion of the frequency subchannels. This situation, in which the longest transmission line has the worst transmission characteristics, is typical for a DSL communication system.

Accordingly, the transmission lines having the lengths of about 100 m, 300 m, and 500 m are determined for further optimization of the transmission powers and transmission power spectral densities in the frequency range which is not used by the transmission line having the length of about 700 m. The adjusted transmission power of the transmission line having the length of about 500 m is set as the maximum allowable transmission power in the further optimization process.

After reapplying the optimization algorithm to the transmission lines having the lengths of about 100 m, 300 m, and 500 m, it is now possible to use the entire available frequency range also for the transmission line having the length of about 500 m. Accordingly, the iterative process may be stopped after the first iteration.

Figure 17A:
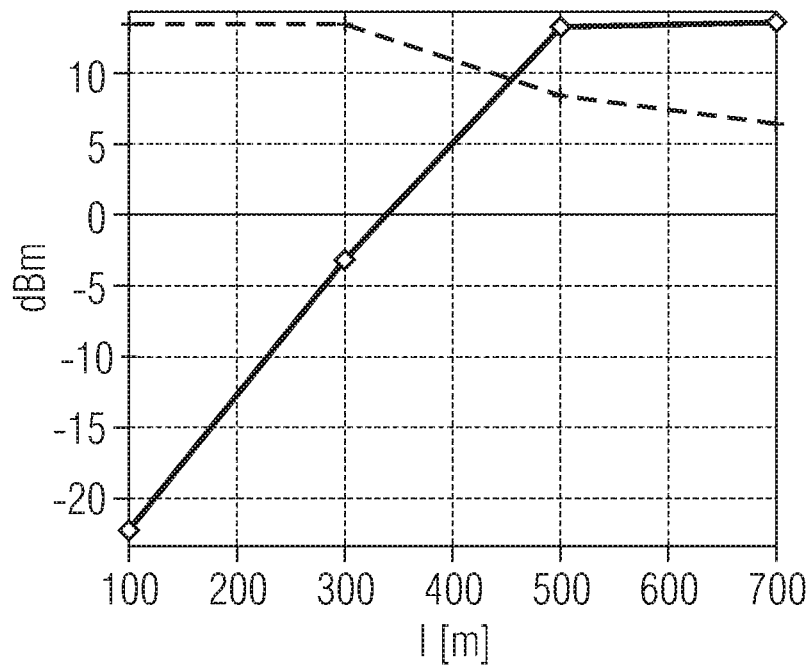
FIG. 17(A) compares exemplary transmission powers with and without adjustment of the transmission powers according to the method of FIG. 16, and FIG. 17(B) compares exemplary bit rates with and without adjustment of the transmission powers according to the method of FIG. 16.
Figure 17B:
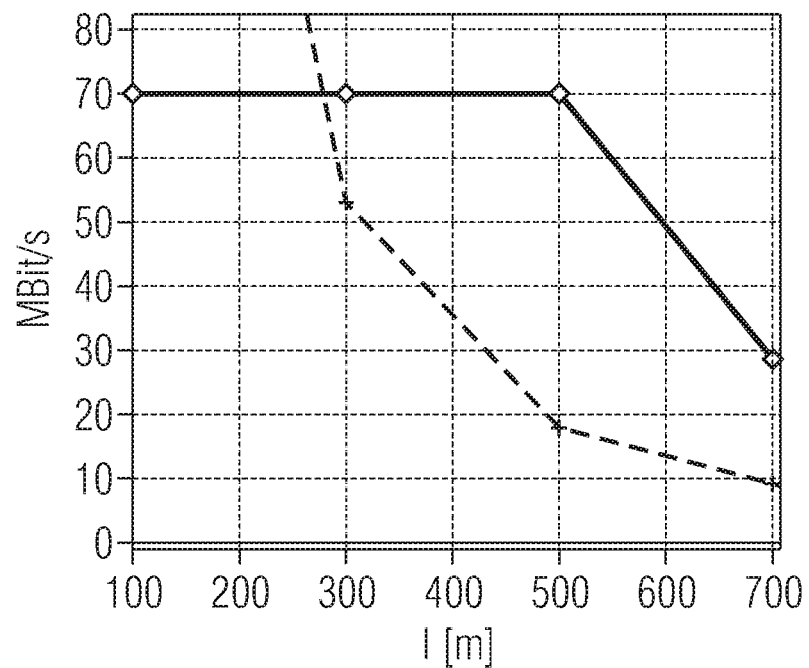
Figure 18:
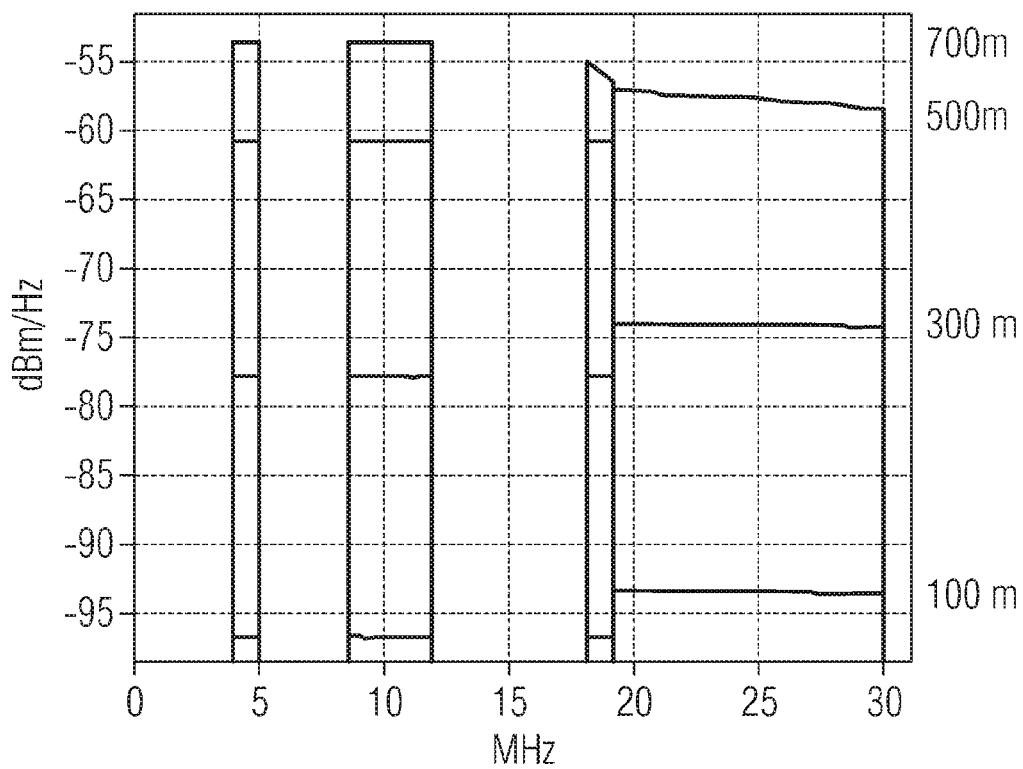
FIG. 18 illustrates exemplary transmission power spectral densities after adjustment of the transmission powers according to the method of FIG. 3.

The resulting transmission powers of the individual transmission lines when using the method of FIG. 16 are illustrated by a solid line in FIG. 17(A). For comparison, the transmission powers of the individual transmission lines without adjustment of the transmission powers and of the transmission power spectral densities are illustrated by a dashed line. In FIG. 17(B) the resulting bit rates of the individual transmission lines when using the method of FIG. 16 are illustrated by a solid line. For comparison, the resulting bit rates without adjustment of the transmission powers and of the transmission power spectral densities are illustrated by a dashed line. In FIG. 18, the resulting power spectral densities of the individual transmission lines are illustrated.

As can be seen from FIGS. 17 and 18, the bit rates of the shorter transmission lines may be increased without adversely affecting the bit rates of the longest transmission line by applying the method of FIG. 16.

In the following, an example will be discussed in which a communication system has only two transmission lines with different lengths. In this case, it is possible to illustrate a "rate region" by allocating the maximum achievable bit rate of the first transmission line to the horizontal axis of a diagram and by allocating the maximum achievable bit rate of the second transmission line to the vertical axis of the diagram. Different points in the diagram may be obtained by assigning different relative bit rate distributions to the two transmission lines, i.e., by using different weight vectors.

Figure 19A:
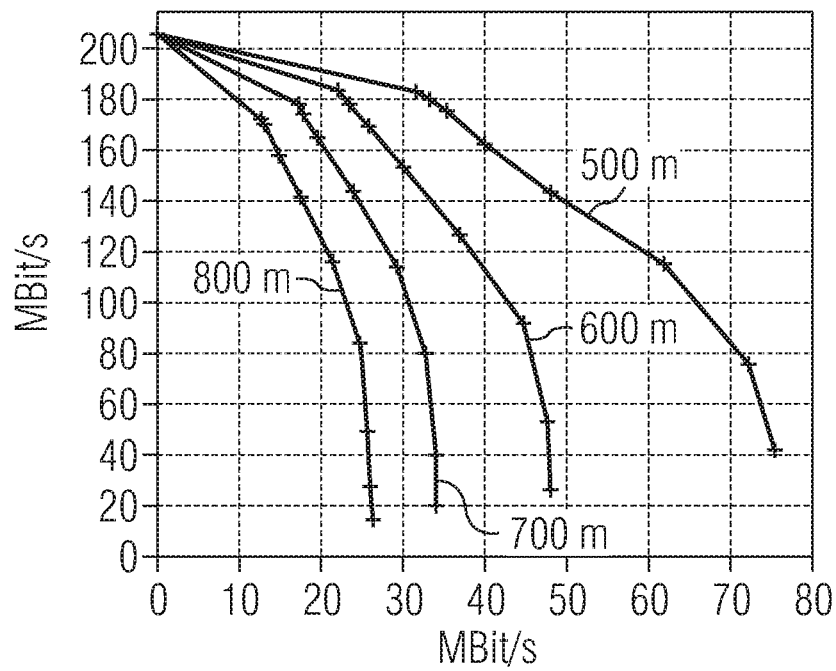
FIGS. 19(A) and 19(B) illustrate rate regions a communication system according to an embodiment of the invention respectively with and without adjustment of the transmission powers according to the method of FIG. 16.
Figure 19B:
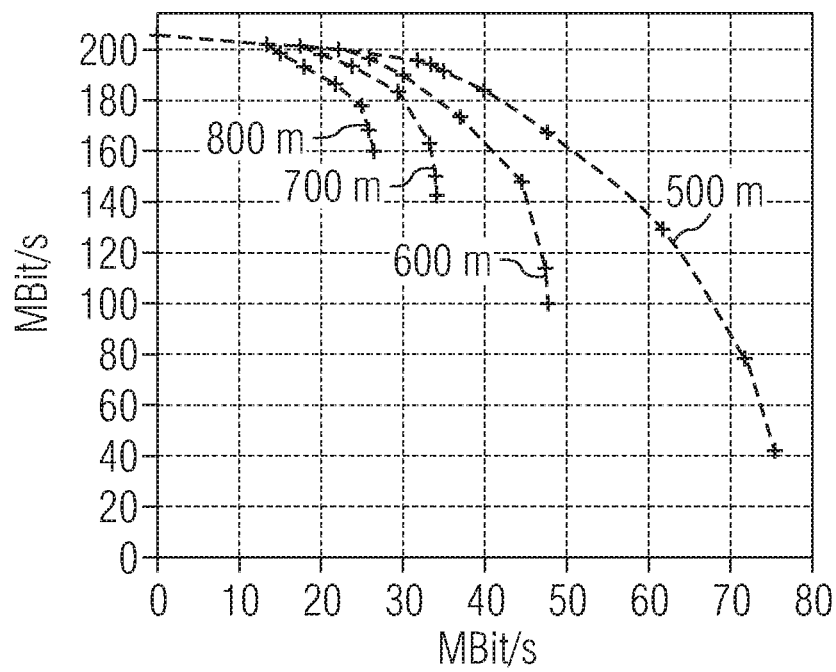

In FIGS. 19(A) and 19(B), rate regions are illustrated for a communication system in which the first transmission line has a length of about 200 m and the second transmission line has a length of about 500 m, 600 m, 700 m, or 800 m. Otherwise, the parameters of the communication system correspond to those of the previous examples.

In FIG. 19(A) the rate regions without applying the method of FIG. 16 are illustrated. In FIG. 19(B), the rate regions when applying the method of FIG. 16 are illustrated.

As can be seen from FIG. 19, the bit rate of the shorter transmission line can be increased by applying the method of FIG. 16, without adversely affecting the bit rate of the longer transmission line. The possible increase of the bit rate increases with increasing difference in the length of the transmission lines.

In the following, an example will be discussed in which a communication system comprises 25 transmission lines in a single cable. The lengths of the transmission lines were assumed to be equally distributed at intervals of about 25 m in a range from about 200 m to about 800 m. Otherwise, the parameters of the communication system correspond to those of the previous examples.

A nominal relative bit rate distribution was defined in which for the transmission lines having a length from about 200 m to about 475 m the respective component of the weight vector is about 1, for the transmission lines having lengths between about 500 m to about 625 m the respective component of the weight vector is about 0.75, and for transmission lines having lengths between about 650 m and about 800 m the respective component of the weight vector is about 0.5.

Figure 20A:
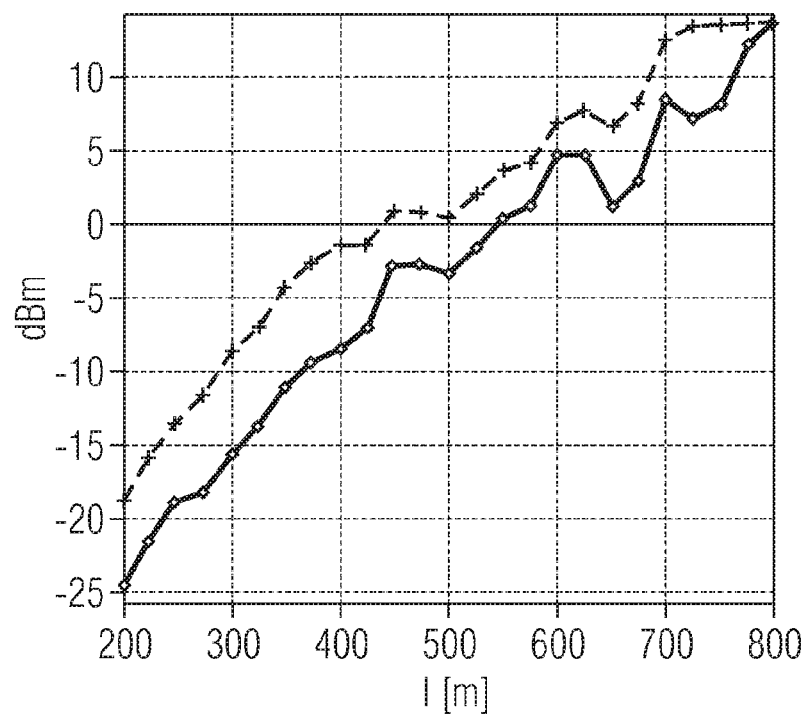
FIG. 20(A) compares exemplary transmission powers with and without adjustment of the transmission powers according to the method of FIG. 16, and FIG. 20(B) compares exemplary bit rates with and without adjustment of the transmission powers according to the method of FIG. 16.
Figure 20B:
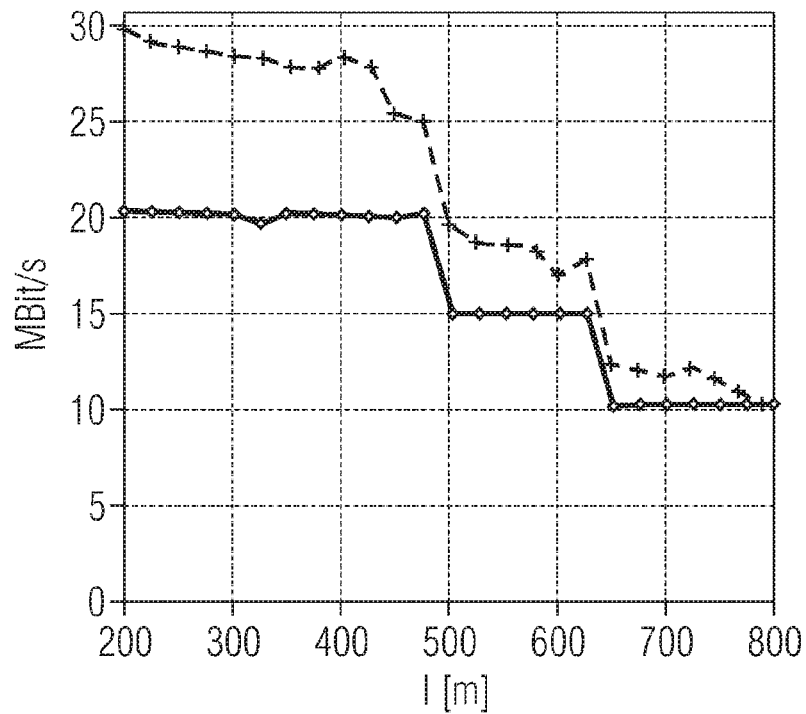

The simulation results are illustrated in FIG. 20. FIG. 20(A) illustrates the resulting transmission powers when merely applying the method of FIG. 3 by a solid line and the resulting transmission powers of the individual transmission lines when additionally applying the method of FIG. 16 by a dashed line. Similarly, FIG. 20(B) illustrates the resulting bit rates of the individual transmission lines when merely applying the method of FIG. 3 by a solid line and the resulting bit rates of the individual transmission lines when additionally applying the method of FIG. 16 by a dashed line.

As can be seen, without applying the method of FIG. 16, a bit rate of about 20 Mbit/s is obtained for the transmission lines having lengths from about 200 m to about 475 m, a bit rate of about 15 Mbit/s is obtained for the transmission lines having a length from about 500 m to about 625 m, and a bit rate of about 10 Mbit/s is obtained for the transmission lines having a length from about 650 m to about 800 m. By applying the method of FIG. 16, all bit rates except for the bit rate of the longest transmission line can be increased. However, the increase of the bit rates is not precisely defined and is larger for the shorter transmission lines than for the longer transmission lines. For the transmission lines up to about 475 m, the increase of the maximum bit rate is about 25 to 50%. However, as can be seen, the obtained relative bit rate distribution after applying the method of FIG. 16 no longer conforms to the nominal bit rate distribution as initially defined by the weight vector.

In view of the above, a method of transmission power control according to a further embodiment of the invention includes iteratively adjusting the weight vector. A corresponding method is illustrated by the block diagram of FIG. 21.

In the following, $$G_l = \begin{pmatrix} G_{1,l} \\ \vdots \\ G_{M,l} \end{pmatrix} \quad (17)$$

denotes the weight vector in the 1-th iteration step.

The method involves iteratively recalculating the weight vector and reapplying the methods of FIG. 3 and FIG. 16 in each iteration step.

Figure 21:
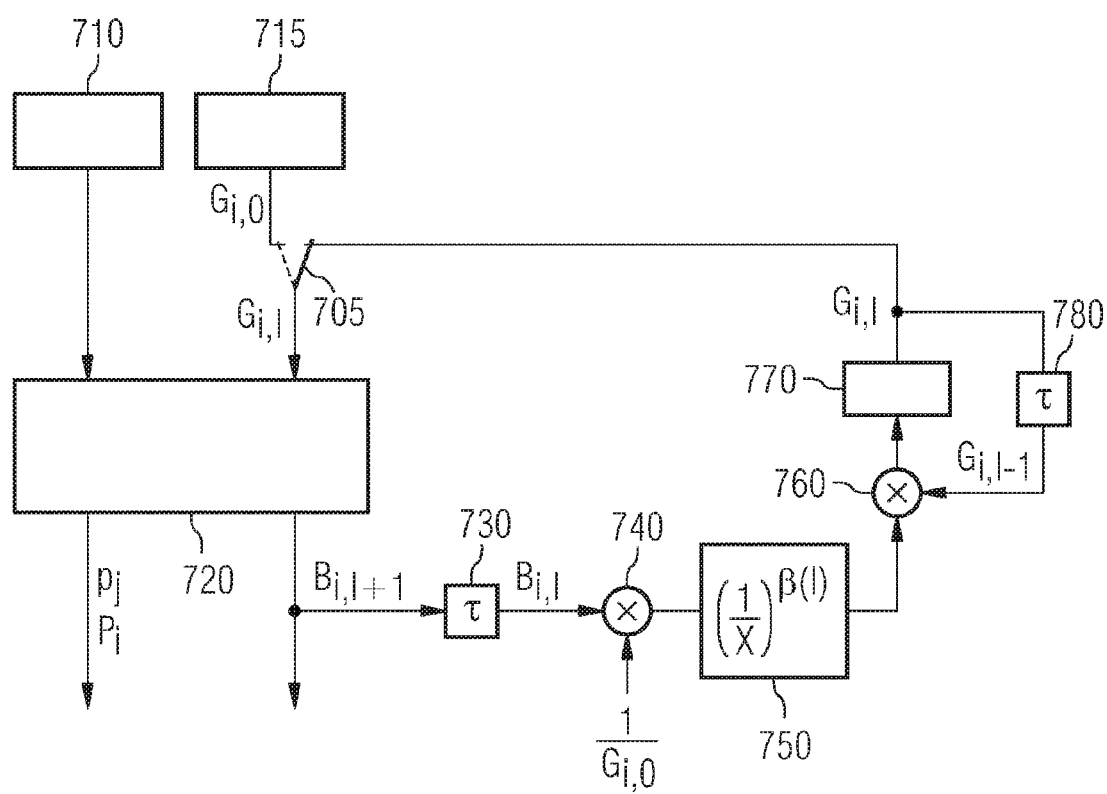
FIG. 21 shows a block diagram illustrating a method of transmission power control according to a further embodiment of the invention.

According to the embodiment, the transmission powers and transmission spectral densities are initially adjusted on the basis of an initial weight vector $G_0$. Again, a usable frequency range and a maximum admissible transmission power are provided as input parameters to the adjustment process. In the illustration of FIG. 21, the maximum usable frequency range is defined in block 710, and the initial weight vector is defined in block 715.

The initial weight vector is then subjected to an iterative adjustment process as schematically illustrated by the switch 705. That is to say, after the initial weight vector has been supplied to the iteration process, the switch 705 is brought from the position illustrated by the dotted line to the position illustrated by the solid line.

The adjustment of transmission powers and transmission power spectral densities is accomplished in block 720. For this purpose, the methods of FIGS. 3 and 16 are applied. Block 720 outputs a transmission power vector having components P, and transmission power spectral densities in the form of a transmission power $p_j$ for the j-th frequency subchannel.

Further, block 720 outputs the maximum bit rates which can be obtained with the adjusted transmission powers and the adjusted transmission power spectral densities, i.e., a bit rate vector:

$$B_l = \begin{pmatrix} B_{1,l} \\ \vdots \\ B_{M,l} \end{pmatrix} \quad (18)$$

of the 1-th iteration step. The bit rate vector is stored in block 730 to be used for recalculating the weight vector in the next iteration step.

In block 740, a weighted bit rate vector is calculated on the basis of the initial weight vector according to:

$$Bg_l = \begin{pmatrix} Bg_{1,l} \\ \vdots \\ Bg_{M,l} \end{pmatrix} = \begin{pmatrix} B_{1,l}/G_1 \\ \vdots \\ B_{M,l}/G_{M,0} \end{pmatrix}. \quad (19)$$

Then, in block 750, the reciprocal values of the components of the weighted bit rate vector are calculated.

According to an embodiment, the reciprocal values may further be raised to the power of a parameter $\beta(1)$ for adjusting the speed and precision of convergence. In particular, the parameter $\beta(1)$ may be varied depending on the iteration step, e.g., in a range between 1 and 2. In other embodiments, $\beta(1)$ may have the same value irrespective of the iteration step, e.g., $\beta(1)=1$.

Then, in block 760, the output of block 750 is multiplied with the old value of the weight vector.

Accordingly, the weight vector of the (l+1)-th iteration step is calculated from the weight vector of the 1-th iteration step according to:

$$G_{l+1} = \begin{pmatrix} G_{1,l} \cdot (G_{1,0}/B_{1,l})^{\beta(l)} \\ \vdots \\ G_{M,l} \cdot (G_{M,0}/B_{M,l})^{\beta(l)} \end{pmatrix}. \quad (20)$$

In other words, the components of the weight vector are recalculated according to:

$$G_{i,l+1}=G_{i,l}\cdot(G_{i,0}/B_{i,l})^{\beta(l)}. \quad (21)$$

The recalculated weight vector is then supplied to block 770 to be scaled in such a way that the maximum component of the recalculated weight vector assumes a value of one. That is to say, the recalculated weight vector is scaled according to:

$$G_l := G_l \cdot \frac{1}{\max\{G_{1,l}, \ldots, G_{M,l}\}}. \quad (22)$$

In other words, the components of the recalculated weight vector are scaled according to:

$$G_{i,l} := \frac{G_{i,l}}{\max\{G_{1,l}, \ldots, G_{M,l}\}}. \quad (23)$$

The output of block 770, i.e. the recalculated and scaled weight vector, is then used in the next iteration by block 720 for adjusting the transmission powers and transmission power spectral densities. Further, the output of block 770 is stored in block 780 to be used for recalculating the weight vector in the next iteration step.

The iterative process may be repeated until the difference between the nominal relative bit rate distribution as defined by the initial weight vector and the obtained relative bit rate distribution is below a predefined threshold or a predefined number of iteration steps is reached.

In the following, a specific example will be discussed in which the transmission powers and the transmission power spectral densities are adjusted according to the method of FIG. 21. In the example, a communication system was considered which corresponds to the example of FIG. 20. The simulation results are illustrated in FIG. 22.

Figure 22A:
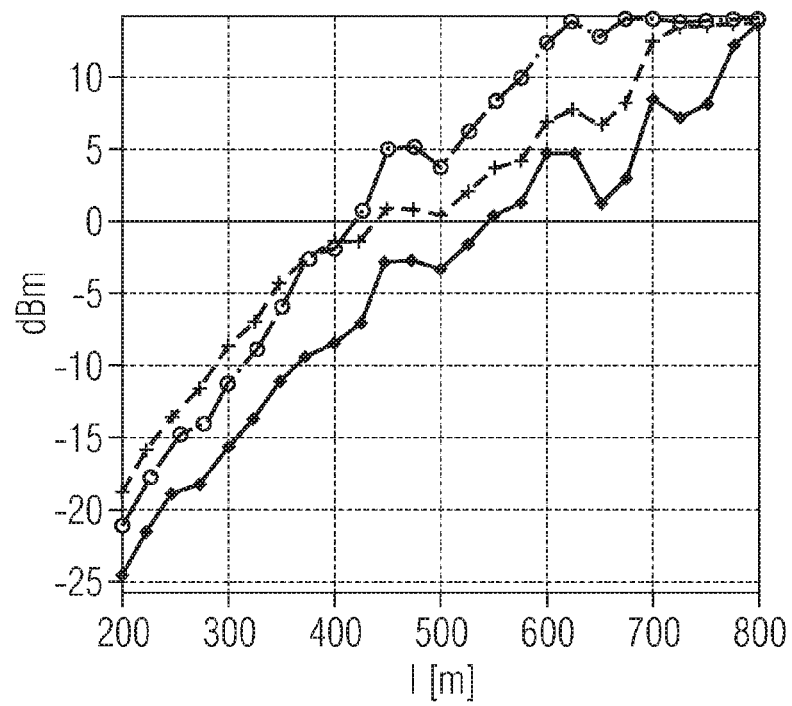
FIG. 22(A) compares exemplary transmission powers obtained with different methods of adjusting the transmission powers, and FIG. 22(B) compares exemplary bit rates obtained with different methods of adjusting the transmission powers.
Figure 22B:
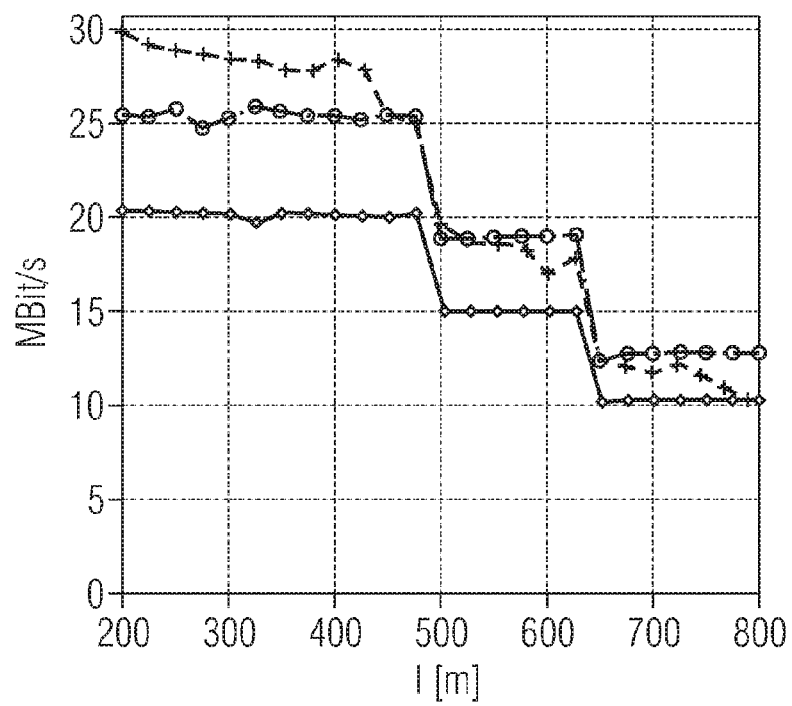

In FIG. 22(A), the transmission powers of the individual transmission lines when merely using the method of FIG. 3 are illustrated by a solid line. The transmission powers of the individual transmission channels when merely applying the methods of FIGS. 3 and 16 are illustrated as a dashed line. The transmission powers when using the methods of FIGS. 3, 16, and 21 are illustrated by a dotted line. Similarly, in FIG. 22(B), the bit rates when merely applying the method of FIG. 3 are illustrated by a solid line. The bit rates of the individual transmission lines when merely applying the methods of FIGS. 3 and 16 are illustrated by a dashed line. The resulting bit rates when applying the methods of FIGS. 3, 16, and 21 are illustrated by a dotted line.

As can be seen, when applying the method of FIG. 21, a uniform increase of the bit rates of about 25% with respect to the bit rates when merely applying the method of FIG. 3 can be achieved. Further, the resulting relative bit rate distribution conforms to the nominal relative bit rate distribution as defined by the initial weight vector. Finally, an increased bit rate is obtained for the longest transmission line as well.

In the methods of adjusting transmission powers and transmission power spectral densities of the above embodiments, various optimization algorithms may be used for adjusting the transmission power spectral densities. According to one embodiment, as mentioned above, the waterfilling algorithm may be used for adjusting the transmission power spectral densities. This will be further explained in the following.

A bit number of the j-th frequency subchannel of a transmission channel can be written as:

$$R_j = \log_2\left(1 + \frac{(S/N)_j}{\Gamma}\right), \quad (24)$$

$(S/N)_j$ being the signal-to-noise ratio of the j-th frequency subchannel at the receiver and $\Gamma$ being the signal-to-noise gap parameter. The signal-to-noise gap parameter is selected to be at least 1 dB, typically in a range from 5 dB to 20 dB. In some embodiments, the signal-to-noise gap parameter may be frequency dependent, i.e., a function of the subchannel index j.

The total bit rate of the transmission channel can be obtained by summing the bit numbers of the frequency subchannels and by multiplication with the symbol frequency according to:

$$B = f_T \cdot \sum_j R_j, \quad (25)$$

$f_T$ being the symbol frequency.

The signal-to-noise ratio at the receiver can be represented by:

$$(S/N)_j = \frac{p_j \cdot |H_j|^2}{\Gamma \cdot \sigma_j^2}. \quad (26)$$

Accordingly, a total bit rate function of the transmission channel can be expressed as:

$$B = f_T \cdot \sum_j \log_2\left(1 + \frac{p_j \cdot |H_j|^2}{\Gamma \cdot \sigma_j^2}\right). \quad (27)$$

In the optimization algorithm, the total bit rate function is maximized. This is accomplished with the additional condition that a maximum value of the transmission power is defined according to:

$$P_{max} = \sum_j p_j. \quad (28)$$

Maximizing the bit rate function as defined in Equation (27) with the additional condition of Equation (28) results in the above-mentioned waterfilling algorithm. The mathematical details of solving the optimization problem are known in the art and will not be further explained herein.

According to further embodiments of the invention, different optimization algorithms than the waterfilling algorithm may be used for adjusting the transmission power spectral densities.

According to one embodiment of the invention, an optimization algorithm is used in which the bit rate function of equation (27) is simplified to:

$$B = f_T \cdot \sum_j \log_2\left(\frac{p_j \cdot |H_j|^2}{\Gamma \cdot \sigma_j^2}\right). \quad (29)$$

Maximizing the total bit rate function as given by equation (29) with the additional condition of equation (28) results in an optimization algorithm may be referred to as "simplified waterfilling algorithm".

The result of the simplified waterfilling algorithm is a piecewise constant transmission power spectral density, i.e., all values of $p_j$ are the same or zero. The values of $p_j$ and the number of usable frequency subchannels are selected in such a way that on the one hand $$\frac{p_j \cdot |H_j|^2}{\sigma_j^2} \geq \Gamma, \quad (30)$$

and on the other hand $$p_j = \frac{P_{max}}{N}, \quad (31)$$

N denoting the number of usable frequency subchannels.

Again, it is refrained from discussing mathematical details of solving the simplified optimization problem, as these are known in the art.

As compared to the waterfilling algorithm, the simplified waterfilling algorithm significantly reduces the computational effort when adjusting the transmission power spectral densities. This is specifically advantageous in a method of transmission power control of multiple transmission channels, e.g., as explained in connection with FIGS. 3, 16, and 21. In other embodiments, the simplified waterfilling algorithm may also be applied to a single transmission channel or in other methods of adjusting the transmission powers of multiple transmission channels.

In the following, examples of applying the simplified waterfilling algorithm are discussed for the case of a communication system having four transmission lines. The lengths of the transmission lines are about 200 m, 300 m, 400 m, and 500 m. Otherwise, the parameters of the communication system correspond to those of the previous examples.

Figure 23A:
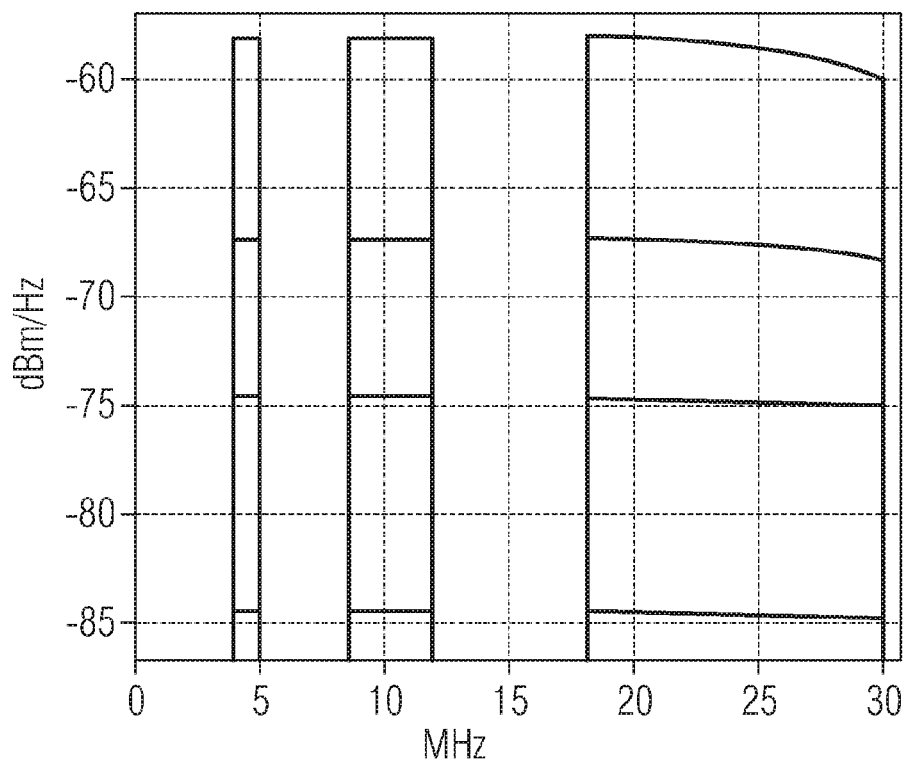
FIGS. 23(A)-23(F) compare exemplary power spectral densities obtained with different methods of adjusting the transmission powers.
Figure 23B:
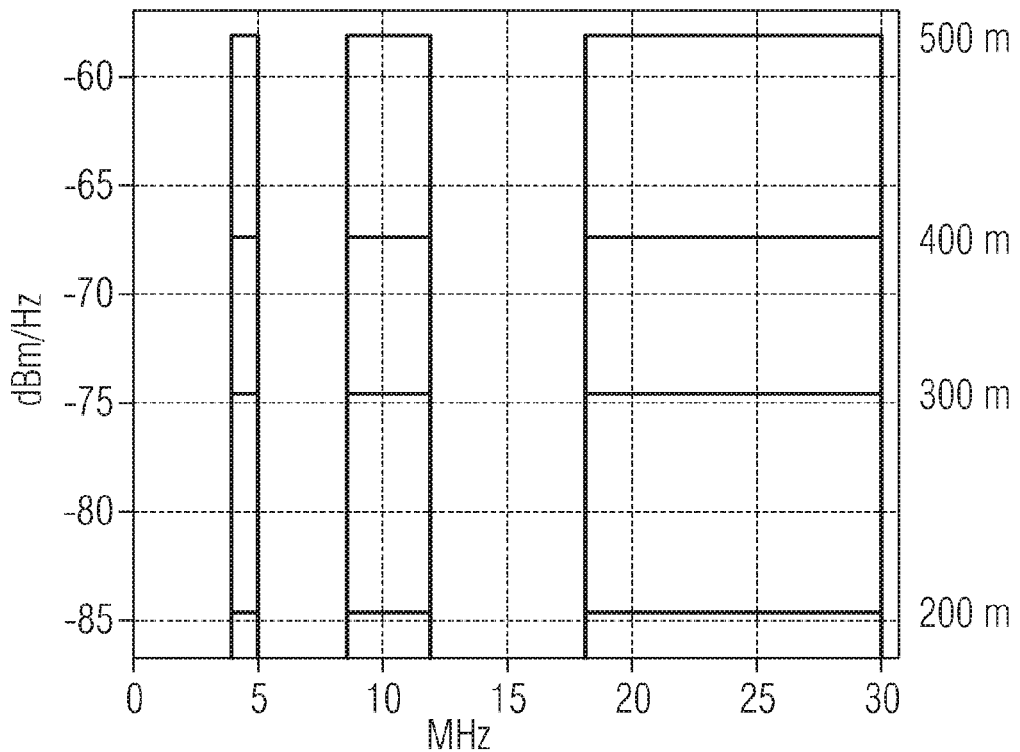

In FIG. 23(A), the resulting power spectral densities when merely adjusting the transmission power spectral densities on the basis of the waterfilling algorithm are illustrated. For comparison, FIG. 23(B) illustrates the corresponding transmission power spectral densities when applying the simplified waterfilling algorithm. As can be seen, the power spectral densities of FIG. 23(B) are piecewise constant in all frequency bands. As compared to that, when using the waterfilling algorithm, there is a drop off of the power spectral densities towards higher frequencies.

Figure 23C:
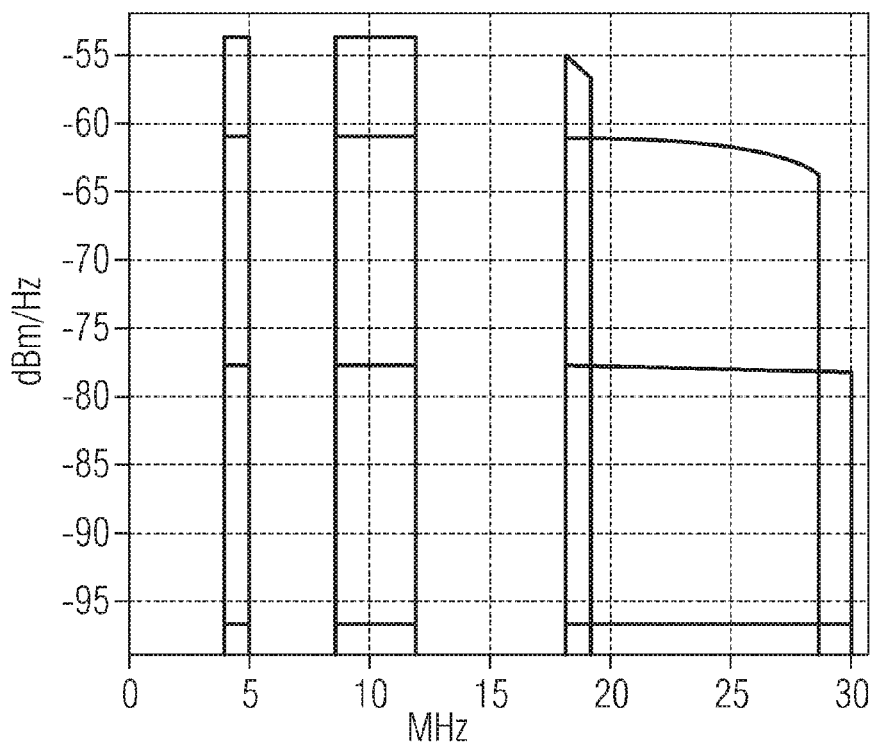
Figure 23D:
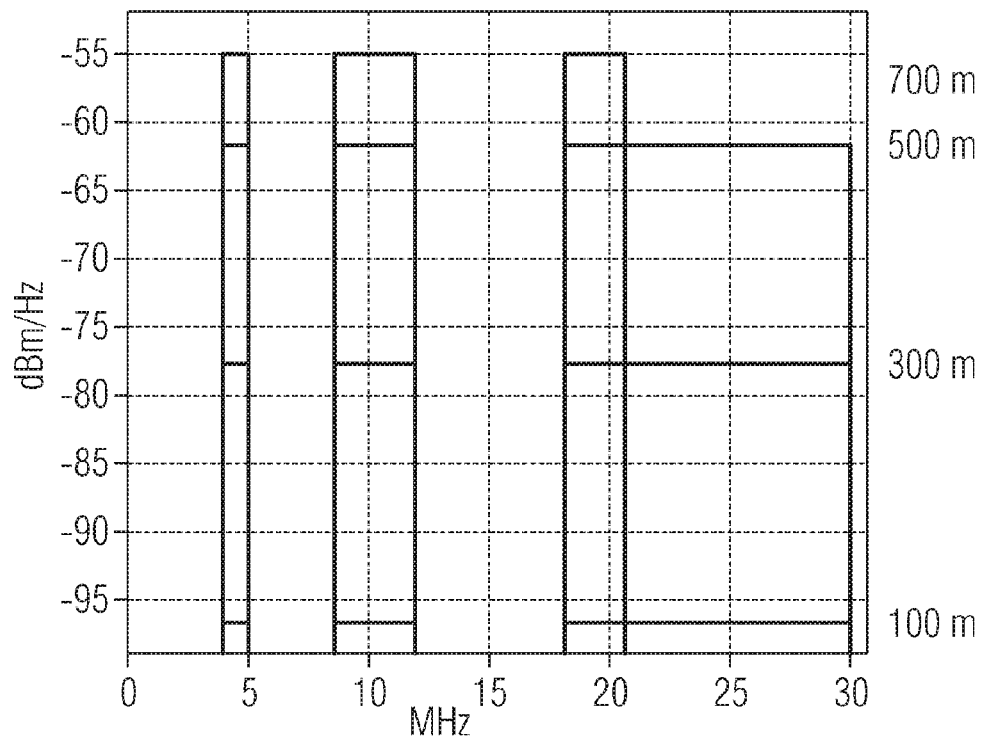

In FIG. 23(C) the power spectral densities are illustrated when applying the waterfilling algorithm and adjusting the transmission powers according to the method of FIG. 3. For comparison, FIG. 23(D) shows the corresponding transmission power spectral densities when applying the simplified waterfilling algorithm and adjusting the transmission powers according to the method of FIG. 3. Again, the power spectral densities obtained using the simplified waterfilling algorithm are piecewise constant.

Figure 23E:
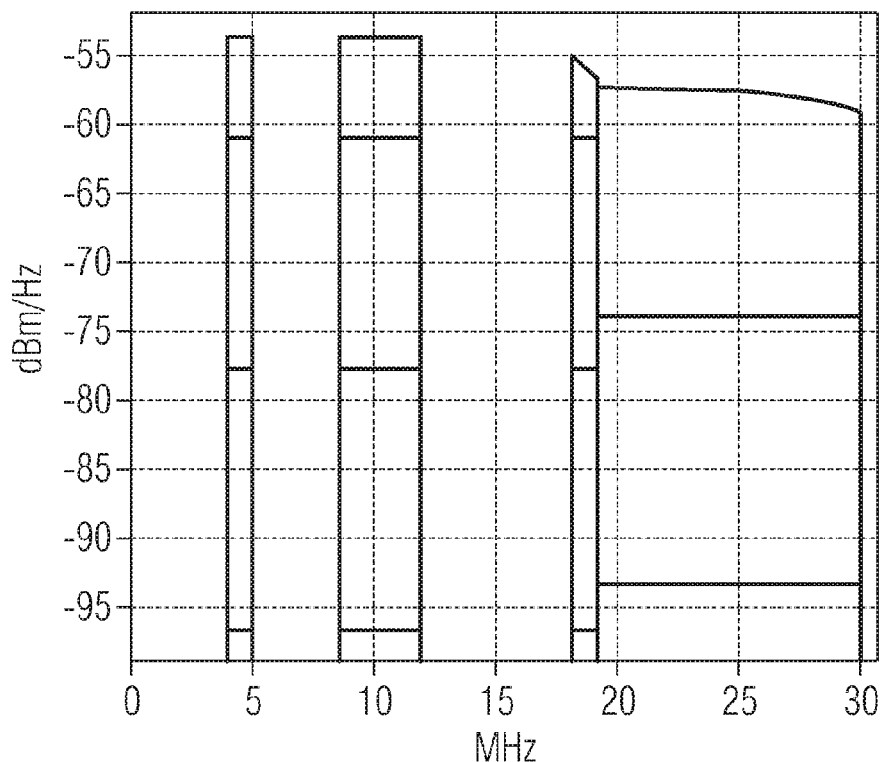
Figure 23F:
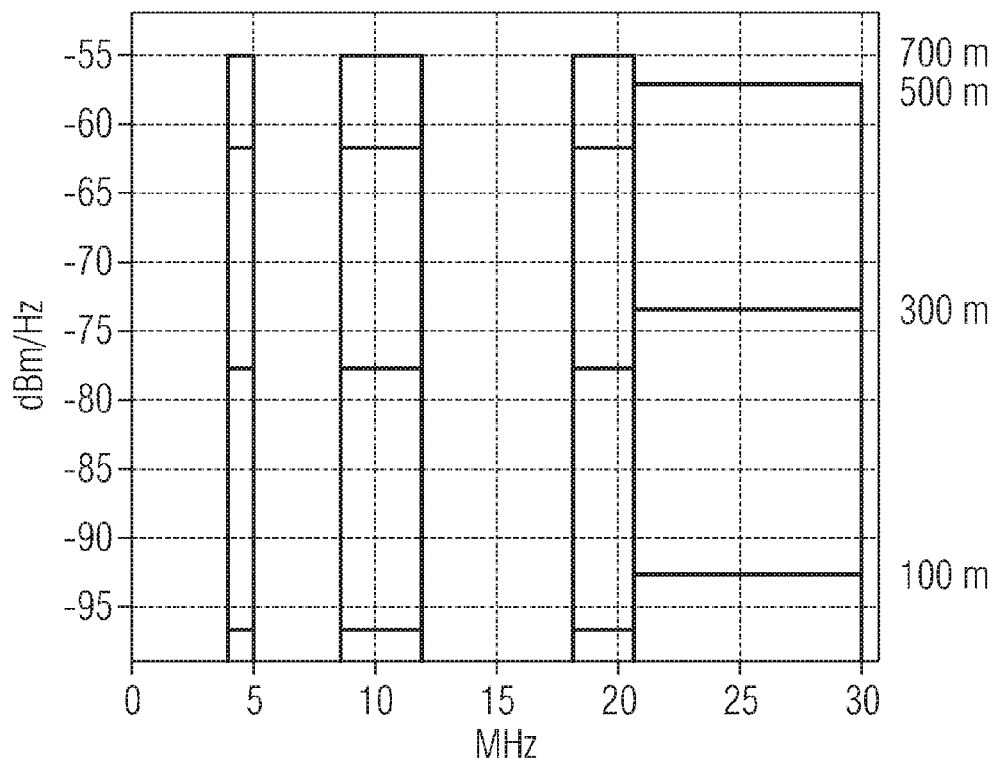

FIG. 23(E) illustrates the power spectral densities when applying the waterfilling algorithm and adjusting the transmission powers according to the methods of FIGS. 3 and 16. In FIG. 23(F), the corresponding transmission power spectral densities are illustrated when applying the simplified waterfilling algorithm and adjusting the transmission powers according to the methods of FIGS. 3 and 16.

The bit rates obtained with the simplified waterfilling algorithm are in each case approximately the same as the bit rates obtained using the waterfilling algorithm.

Figure 24A:
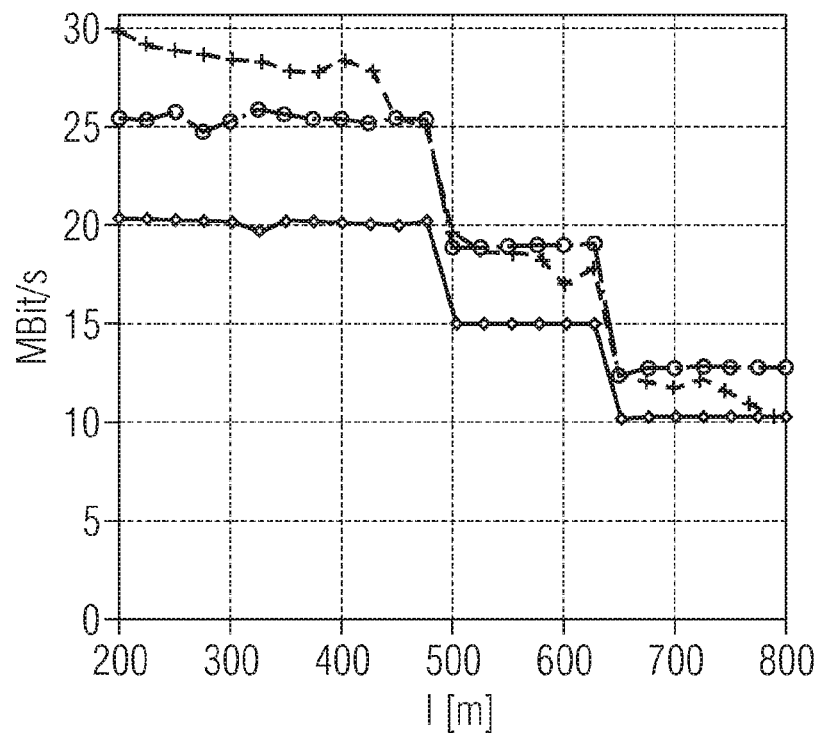
FIGS. 24(A) and 24(B) compare exemplary bit rates obtained with different methods of adjusting the transmission powers.

In a final example, the same communication system was considered as in the example of FIG. 20. In FIG. 24(A), the resulting bit rates of the individual transmission lines are illustrated when applying the waterfilling algorithm for adjusting the transmission power spectral densities. The bit rates obtained when merely applying the method of FIG. 3 to adjust the transmission powers are illustrated by a solid line. The bit rates obtained when merely applying the methods of FIGS. 3 and 16 to adjust the transmission powers are illustrated by a dashed line. The bit rates obtained when applying the methods of FIG. 21 to adjust the transmission powers are illustrated by a dotted line.

Figure 24B:
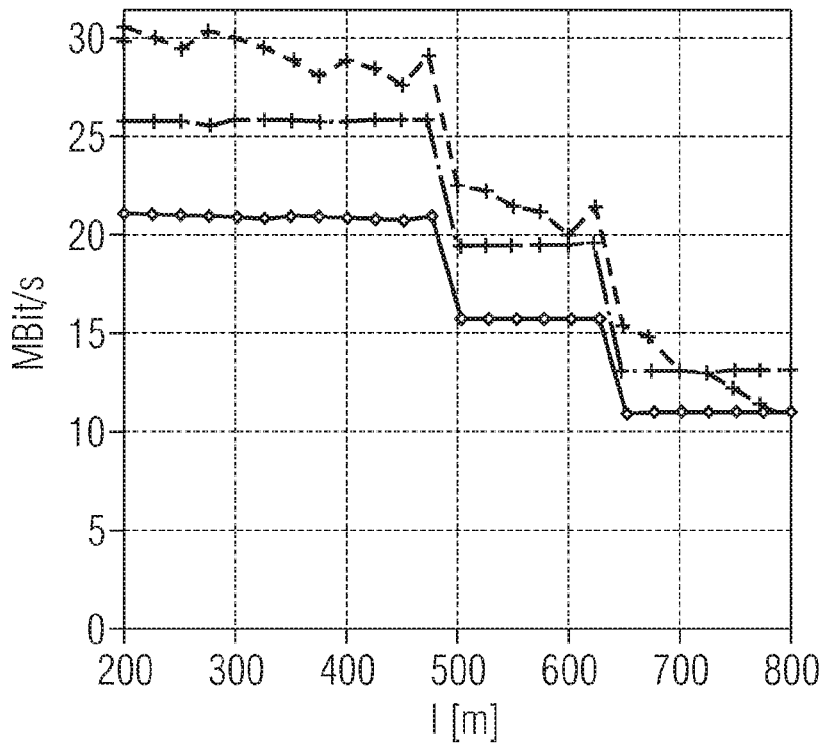

In FIG. 24(B), the solid line illustrates the bit rates obtained when applying the simplified waterfilling algorithm in connection with the method of FIG. 3 only. A dashed line illustrates the bit rates obtained when applying the simplified waterfilling algorithm in connection with the methods of FIGS. 3 and 16 only. The dotted line illustrates the bit rates obtained when applying the simplified waterfilling algorithm in connection with the methods of FIGS. 3, 16, and 21.

As can be seen from FIG. 24, in the specific example, the bit rates obtained using the simplified waterfilling algorithm are even higher than those obtained using the waterfilling algorithm.

In the foregoing, various embodiments of methods of transmission power control have been described. The methods may be applied in various types of communication systems and communication devices, e.g., in a DSLAM. In addition, the methods are also suitable for communication systems and communication devices using wireless transmission channels, such as in orthogonal frequency division multiplexing systems.

Further, various modifications are possible in the above-described embodiments. For example, optimization algorithms other than the waterfilling algorithm or the simplified waterfilling algorithm may be used in connection with the methods of FIGS. 3, 16, and 21. Further, the optimization algorithms may involve imposing other or additional boundary conditions. For example, also a maximum transmission power spectral density may be defined. The number of transmission channels and/or of frequency subchannels may be selected as appropriate. Various models may be used for the transmission channel characteristics.

It is to be understood that the above-described embodiments may be combined with each other as appropriate.

Further, it is to be noted that the described methods and concepts may be implemented in hardware, software, and a combination thereof. The implementation in software may take place on a digital storage medium having electronically readable control signals, which may cooperate with a programmable computer system in such a way that the corresponding method is performed. Thus, embodiments of the invention may also include a computer program product having a program code stored on a machine-readable carrier for performing any of the above-described methods or combinations thereof when the program code is executed on a computer. In other words, the embodiments of the invention may thus be realized as a computer program having a program code for performing the method, when the computer program runs on a computer.

What is claimed is:

1. A method of transmission power control, the method comprising:
   a) applying an optimization algorithm to adjust a transmission power spectral density of transmission channels, each of the transmission channels comprising a plurality of frequency subchannels;
   b) determining a transmission channel in which, after adjusting the transmission power spectral density, a portion of the frequency subchannels is unused, and determining a group of remaining transmission channels, the unused portion of the frequency subchannels being determined based on the applying the optimization algorithm;
   c) applying the optimization algorithm to adjust the transmission power spectral density of the transmission channels of the group of the remaining transmission channels with respect to frequency subchannels corresponding to the unused portion of the frequency subchannels; and
   d) a controller generating a control signal to cause the adjusted power spectral density to be applied the transmission channels.

2. The method according to claim 1, further comprising:
   e) repeating steps b) and c) with the group of the remaining transmission channels.

3. The method according to claim 1, wherein the optimization algorithm maximizes a total bit rate function of the transmission channel.

4. The method according to claim 3, wherein the total bit rate function B is given by $$B = f_T \cdot \sum_j \log_2\left(1 + \frac{p_j \cdot |H_j|^2}{\Gamma \cdot \sigma_j^2}\right),$$

wherein:
$p_j$ is the transmission power of a j-th frequency subchannel,
$|H_j|^2$ is a power transmission function of the j-th frequency subchannel,
$\sigma_j^2$ is an interfering power of the j-th frequency subchannel at a receiver,
$\Gamma$ is a signal-to-noise ratio gap parameter with $\Gamma \geq 1$ dB, and
$f_T$ is a symbol frequency.

5. The method according to claim 3, wherein the total bit rate function B is given by $$B = f_T \cdot \sum_j \log_2\left(\frac{p_j \cdot |H_j|^2}{\Gamma \cdot \sigma_j^2}\right),$$

wherein:
$p_j$ is the transmission power of a j-th frequency subchannel,
$|H_j|^2$ is a power transmission function of the j-th frequency subchannel,
$\sigma_j^2$ is an interfering power of the j-th frequency subchannel at a receiver,
$\Gamma$ is a signal-to-noise ratio gap parameter with $\Gamma \geq 1$ dB, and
$f_T$ is a symbol frequency.

6. The method according to claim 1, comprising:
assigning a relative bit rate to each of the transmission channels, the relative bit rates defining a nominal bit rate distribution; and
adjusting a transmission power of each transmission channel in such a way that an effective bit rate distribution conforms to the nominal bit rate distribution.

7. The method according to claim 6, further comprising:
f) iteratively calculating a total transmission power $P_{i,k+1}$ for an i-th transmission channel in a (k+1)-th iteration step according to $$P_{i,k+1} = P_{i,k} \cdot s^{-(Bg_{i,k} - \min\{Bg_{1,k}, \ldots, Bg_{M,k}\}) \cdot \alpha},$$

wherein:
$Bg_{i,k}$ is a weighted bit rate of the i-th transmission channel in a k-th iteration calculated from the effective bit rate $B_{i,k}$ of the i-th transmission channel and a weight factor $G_{i,l}$ of the i-th transmission channel according to $$Bg_{i,k+1} = B_{i,k}/G_{i,l},$$

$s > 1$,
$\alpha \geq 1$, and
M is a number of the transmission channels;
g) scaling the total transmission powers $P_{i,k}$ of each iteration step with respect to a maximum admissible transmission power $P_{max}$ according to $$P_{i,k} := P_{i,k} \cdot \frac{P_{max}}{\max\{P_{1,k}, \ldots, P_{M,k}\}};$$

h) iteratively calculating the weight factors $G_{i,l}$ in an l-th iteration step according to:

$$G_{i,l+1} = G_{i,l} \cdot (G_{i,0}/B_{i,l})^\beta,$$

wherein $\beta \geq 1$;
i) scaling the recalculated weight factors $G_{i,l}$ according to $$G_{i,l} := \frac{G_{i,l}}{\max\{G_{1,l}, \ldots, P_{M,l}\}};$$

and
j) repeating steps a) to g) in each iteration step of step h).

8. The method according to claim 7, wherein $\beta$ is adjusted depending on the iteration step.

9. The method according to claim 1, wherein each of the transmission channels corresponds to a digital subscriber line.

10. A communication device, comprising:
a plurality of transmission ports configured to be coupled to a respective transmission channel of a plurality of transmission channels, each of the transmission channels comprising a plurality of frequency subchannels; and
a controller configured to adjust a transmission power spectral density of the transmission channels on a basis of an optimization algorithm,
wherein the controller is configured to
determine a transmission channel in which, after adjusting the transmission power spectral density, a portion of the frequency subchannels is unused,
determine a group of remaining transmission channels, and
adjust the transmission power spectral density of the transmission channels of the group of the remaining transmission channels with respect to frequency subchannels corresponding to the unused portion of the frequency subchannels on the basis of the optimization algorithm, wherein the unused portion of the frequency subchannels are determined based on applying the optimization algorithm.

11. The communication device according to claim 10, wherein the optimization algorithm maximizes a total bit rate function of the transmission channel.

12. The communication device according to claim 11, wherein the total bit rate function is given by:

$$B = f_T \cdot \sum_j \log_2\left(1 + \frac{p_j \cdot |H_j|^2}{\Gamma \cdot \sigma_j^2}\right),$$

wherein:
$p_j$ is the transmission power of a j-th frequency subchannel,
$|H_j|^2$ is a power transmission function of the j-th frequency subchannel,
$\sigma_j^2$ is an interfering power of the j-th frequency subchannel at a receiver,
$\Gamma$ is a signal-to-noise ratio gap parameter with $\Gamma \geq 1$ dB, and
$f_T$ is a symbol frequency.

13. The communication device according to claim 11, wherein the total bit rate function is given by:

$$B = f_T \cdot \sum_j \log_2\left(\frac{p_j \cdot |H_j|^2}{\Gamma \cdot \sigma_j^2}\right),$$

wherein:
p_j is the transmission power of a j-th frequency subchannel,
$|H_j|^2$ is a power transmission function of the j-th frequency subchannel,
$\sigma_j^2$ is an interfering power of the j-th frequency subchannel at a receiver,
$\Gamma$ is a signal-to-noise ratio gap parameter with $\Gamma \geq 1$ dB, and
$f_T$ is a symbol frequency.

14. The communication device according to claim 10, wherein the controller is configured to assign a relative bit rate to the transmission channels, the relative bit rates defining a nominal bit rate distribution, and to adjust a transmission power of the transmission channels in such a way that an effective bit rate distribution conforms to the nominal bit rate distribution.

15. A method of transmission power control, comprising:
  assigning a relative bit rate to each of a plurality of transmission channels, the relative bit rates defining a nominal bit rate distribution;
  adjusting a transmission power of the transmission channels in such a way that an effective bit rate distribution conforms to the nominal bit rate distribution; and
  a controller generating a control signal to cause the adjusted transmission powers to be applied to the transmission channels.

16. The method according to claim 15, wherein adjusting the transmission power comprises iteratively calculating a transmission power for at least one of the transmission channels.

17. The method according to claim 15, comprising:
  iteratively calculating a transmission power $P_{i,k+1}$ for an i-th transmission channel in a (k+1)-th iteration step according to $$P_{i,k+1} = P_{i,k} \cdot s^{-(Bg_{i,k} - \min\{Bg_{1,k}, \ldots, Bg_{M,k}\}) \cdot \alpha},$$

wherein:
$Bg_{i,k}$ is a weighted bit rate of the i-th transmission channel in a k-th iteration calculated from the bit rate $B_{i,k}$ of the i-th transmission channel and a predefined weight factor $G_i$ of the i-th transmission channel according to:

$$Bg_{i,k+1} = B_{i,k}/G_i,$$

$s > 1$,
$\alpha \geq 1$, and
M is a number of the transmission channels; and
scaling the transmission powers $P_{i,k}$ of each iteration step with respect to a maximum admissible transmission power $P_{max}$ according to $$P_{i,k} := P_{i,k} \cdot \frac{P_{max}}{\max\{P_{1,k}, \ldots, P_{M,k}\}}.$$

18. The method according to claim 17, wherein $\alpha$ is adjusted depending on the iteration step.

19. A communication device, comprising:
  a plurality of transmission ports configured to be coupled to a respective transmission channel; and
  a controller configured to assign a relative bit rate the transmission channels, the relative bit rates defining a nominal bit rate distribution and to adjust a transmission power of the transmission channels based on a relative bit rate distribution.

20. The communication device according to claim 19, wherein the controller is configured to adjust the transmission power of the transmission channels in such a way that an effective bit rate distribution conforms to the nominal bit rate distribution.

21. The communication device according to claim 19, wherein the controller is configured to iteratively calculate the transmission power for an i-th transmission channel in a (k+1)-th iteration according to $$P_{i,k+1} = P_{i,k} \cdot s^{-(Bg_{i,k} - \min\{Bg_{1,k}, \ldots, Bg_{M,k}\}) \cdot \alpha},$$

wherein:
$Bg_{i,k}$ is a weighted bit rate of the i-th transmission channel in a k-th iteration calculated from the bit rate $B_{i,k}$ of the i-th transmission channel and a predefined weight factor $G_i$ of the i-th transmission channel according to:

$$Bg_{i,k+1} = B_{i,k}/G_i,$$

$s > 1$,
$\alpha \geq 1$, and
M is a number of the transmission channels, and
wherein the controller is configured to scale the transmission powers $P_{i,k}$ of each iteration step with respect to a maximum admissible transmission power $P_{max}$ according to $$P_{i,k} := P_{i,k} \cdot \frac{P_{max}}{\max\{P_{1,k}, \ldots, P_{M,k}\}}.$$

22. The communication device according to claim 21 wherein the controller is configured to adjust $\alpha$ depending on the iteration step.

23. The method according to claim 1, wherein the optimization algorithm is based on a ratio of the transmission power of one of the frequency sub-channels to an interfering power of the frequency sub-channel at a receiver.

24. The method according to claim 23, wherein the optimization algorithm maximizes a function of the ratio.

25. The method according to claim 1, wherein the optimization algorithm is based on a function comprising a logarithmic function of a ratio of the transmission power of one of the frequency sub-channels to an interfering power of the frequency sub-channel at a receiver.

26. The communication device according to claim 10, wherein the optimization algorithm is based on a ratio of the transmission power of one of the frequency sub-channels to an interfering power of the frequency sub-channel at a receiver.

27. The method according to claim 15, further comprising applying an optimization algorithm based on a ratio of the transmission power of a frequency sub-channel of a transmission channel to an interfering power of the frequency sub-channel of the transmission channel at a receiver.

28. The communication device according to claim 19, wherein the controller applies an optimization algorithm based on a ratio of transmission power of a frequency sub-channel to an interfering power of the frequency sub-channel at a receiver.

* * * * *